US008893468B2

(12) United States Patent
Prabhu

(10) Patent No.: US 8,893,468 B2
(45) Date of Patent: Nov. 25, 2014

(54) PROCESSING FUEL AND WATER

(75) Inventor: Edan D. Prabhu, Mission Viejo, CA (US)

(73) Assignee: Ener-Core Power, Inc., Irvine, CA (US)

( * ) Notice: Subject to any disclaimer, the term of this patent is extended or adjusted under 35 U.S.C. 154(b) by 877 days.

(21) Appl. No.: 13/048,796

(22) Filed: Mar. 15, 2011

(65) Prior Publication Data

US 2011/0219780 A1    Sep. 15, 2011

Related U.S. Application Data

(60) Provisional application No. 61/313,995, filed on Mar. 15, 2010.

(51) Int. Cl.
| *F02C 3/30* | (2006.01) |
| *F22B 1/26* | (2006.01) |
| *F23K 5/22* | (2006.01) |
| *F02C 6/18* | (2006.01) |
| *F02C 3/24* | (2006.01) |
| *F23K 5/08* | (2006.01) |
| *F01K 13/00* | (2006.01) |

(52) U.S. Cl.
CPC ... *F02C 3/24* (2013.01); *F22B 1/26* (2013.01); *F23R 2900/00002* (2013.01); *F02C 3/305* (2013.01); *F23K 5/22* (2013.01); *F02C 6/18* (2013.01); *F23K 2301/10* (2013.01); *F23K 5/08* (2013.01); *F01K 13/00* (2013.01)
USPC ........ 60/39.463; 60/39.12; 60/736; 60/39.53; 60/775

(58) Field of Classification Search
CPC .... F02C 3/22; F02C 3/30; F23C 2900/99001; F23C 99/006
USPC ............. 60/39.12, 39.463, 39.53, 39.55, 737, 60/39.822, 736, 775, 39.182, 39.26, 39.3, 60/723
See application file for complete search history.

(56) References Cited

U.S. PATENT DOCUMENTS

| 2,303,381 A | 12/1942 | New |
| 2,433,932 A | 1/1948 | Stosick |

(Continued)

FOREIGN PATENT DOCUMENTS

| CH | 319366 A | 2/1975 |
| GB | 2080934 A | 2/1982 |

(Continued)

OTHER PUBLICATIONS

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

(Continued)

*Primary Examiner* — Phutthiwat Wongwian
*Assistant Examiner* — Steven Sutherland
(74) *Attorney, Agent, or Firm* — McDermott Will & Emery LLP

(57) ABSTRACT

Fuel is oxidized with air in a pressurized reaction chamber containing water. Water, fuel, or both may be communicated into the reaction chamber in a gaseous state, a liquid state, or both. For example, a liquid mixture that includes the water and/or the fuel can be evaporated to form a gas mixture, and the gas mixture can be communicated into the reaction chamber. Additionally or alternatively, the liquid mixture that includes the water and/or the fuel can be communicated into the reaction chamber and evaporated in the reaction chamber. The water and the fuel may be communicated into the reaction chamber separately or in combination.

52 Claims, 8 Drawing Sheets

(56) References Cited

U.S. PATENT DOCUMENTS

| | | |
|---|---|---|
| 2,443,841 A | 6/1948 | Sweeney |
| 2,624,172 A | 1/1953 | Houdry |
| 2,630,678 A | 3/1953 | Pratt |
| 2,655,786 A | 10/1953 | Carr |
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,111,644 A | 9/1978 | Buckholdt |
| 4,125,359 A | 11/1978 | Lempa |
| 4,163,366 A | 8/1979 | Kent |
| 4,168,950 A | 9/1979 | Seemann et al. |
| 4,187,672 A | 2/1980 | Rasor |
| 4,192,642 A | 3/1980 | Lempa |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Grever |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,733,528 A | 3/1988 | Pinto |
| 4,741,690 A | 5/1988 | Heed |
| 4,754,607 A | 7/1988 | Mackay |
| 4,769,149 A | 9/1988 | Nobilet et al. |
| 4,794,753 A | 1/1989 | Beebe |
| 4,823,711 A | 4/1989 | Kroneberger et al. |
| 4,828,481 A | 5/1989 | Weil et al. |
| 4,838,782 A | 6/1989 | Wills |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,941,415 A | 7/1990 | Pope et al. |
| 4,953,512 A | 9/1990 | Italiano |
| 4,974,530 A | 12/1990 | Lyon |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Dalla Betta et al. |
| 5,190,453 A | 3/1993 | Le et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Dalla Betta et al. |
| 5,524,432 A | 6/1996 | Hansel |
| 5,524,599 A | 6/1996 | Kong et al. |
| 5,533,890 A | 7/1996 | Holst et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,635,139 A | 6/1997 | Holst et al. |
| 5,637,283 A | 6/1997 | Stilger et al. |
| 5,650,128 A | 7/1997 | Holst et al. |
| 5,685,156 A | 11/1997 | Willis et al. |
| 5,697,776 A | 12/1997 | Van Eerden et al. |
| 5,709,541 A | 1/1998 | Gensler et al. |
| 5,770,584 A | 6/1998 | Kucera et al. |
| 5,770,784 A | 6/1998 | Heywood et al. |
| 5,784,875 A * | 7/1998 | Statler ............................ 60/775 |
| 5,806,298 A | 9/1998 | Klosek et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,921,763 A | 7/1999 | Martin |
| 5,944,503 A | 8/1999 | Van Eerden et al. |
| 6,017,172 A | 1/2000 | Ukegawa et al. |
| 6,019,172 A | 2/2000 | Wellington et al. |
| 6,033,207 A | 3/2000 | Cummings |
| 6,053,699 A | 4/2000 | Turnquist et al. |
| 6,070,404 A | 6/2000 | Bosley et al. |
| 6,095,793 A | 8/2000 | Greeb |
| 6,107,693 A | 8/2000 | Mongia et al. |
| 6,109,018 A | 8/2000 | Rostrup-Nielsen et al. |
| 6,116,014 A | 9/2000 | Dalla Betta et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,882 B1 | 8/2001 | Wellington et al. |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,389,794 B2 * | 5/2002 | Ranasinghe et al. ............ 60/775 |

(56) References Cited

U.S. PATENT DOCUMENTS

| | | | |
|---|---|---|---|
| 6,391,267 B1 | 5/2002 | Martin et al. | |
| 6,393,727 B1 | 5/2002 | Seelig et al. | |
| 6,393,821 B1 | 5/2002 | Prabhu | |
| 6,434,945 B1 * | 8/2002 | Mandai et al. | 60/740 |
| 6,469,181 B1 | 10/2002 | Gruber et al. | |
| 6,487,860 B2 | 12/2002 | Mayersky et al. | |
| 6,497,615 B1 | 12/2002 | Klager | |
| 6,521,566 B1 | 2/2003 | Magno et al. | |
| 6,539,720 B2 | 4/2003 | Rouse et al. | |
| 6,551,068 B2 | 4/2003 | Blotenberg | |
| 6,595,001 B2 | 7/2003 | Rautenbach et al. | |
| 6,595,003 B2 * | 7/2003 | Dalla Betta et al. | 60/777 |
| 6,612,112 B2 | 9/2003 | Gilbreth et al. | |
| 6,634,176 B2 | 10/2003 | Rouse et al. | |
| 6,639,328 B2 | 10/2003 | Wacknov | |
| 6,655,137 B1 | 12/2003 | Sardari | |
| 6,657,332 B2 | 12/2003 | Balas | |
| 6,657,348 B2 | 12/2003 | Qin et al. | |
| 6,675,583 B2 | 1/2004 | Willis et al. | |
| 6,696,130 B1 | 2/2004 | Kasai et al. | |
| 6,698,412 B2 | 3/2004 | Dalla Betta | |
| 6,715,296 B2 | 4/2004 | Bakran et al. | |
| 6,718,772 B2 | 4/2004 | Dalla Betta et al. | |
| 6,720,685 B2 | 4/2004 | Balas | |
| 6,732,531 B2 | 5/2004 | Dickey | |
| 6,747,372 B2 | 6/2004 | Gilbreth et al. | |
| 6,748,742 B2 | 6/2004 | Rouse et al. | |
| 6,751,941 B2 | 6/2004 | Edelman et al. | |
| 6,784,565 B2 | 8/2004 | Wall et al. | |
| 6,787,933 B2 | 9/2004 | Claude et al. | |
| 6,796,129 B2 | 9/2004 | Yee et al. | |
| 6,804,946 B2 | 10/2004 | Willis et al. | |
| 6,810,678 B1 | 11/2004 | Luk | |
| 6,812,586 B2 | 11/2004 | Wacknov et al. | |
| 6,812,587 B2 | 11/2004 | Gilbreth et al. | |
| 6,815,932 B2 | 11/2004 | Wall | |
| 6,824,328 B1 | 11/2004 | Vinegar et al. | |
| 6,832,480 B1 | 12/2004 | Anguil | |
| 6,864,595 B2 | 3/2005 | Wall | |
| 6,892,542 B2 | 5/2005 | Voinov | |
| 6,895,760 B2 | 5/2005 | Kesseli | |
| RE38,784 E | 8/2005 | Maese et al. | |
| 6,923,001 B2 | 8/2005 | Laster et al. | |
| RE38,815 E | 10/2005 | Maese et al. | |
| 6,951,110 B2 | 10/2005 | Kang | |
| 6,960,840 B2 | 11/2005 | Willis et al. | |
| 6,962,055 B2 | 11/2005 | Chen et al. | |
| 7,007,486 B2 | 3/2006 | Sprouse et al. | |
| 7,007,487 B2 | 3/2006 | Belokon et al. | |
| 7,017,329 B2 | 3/2006 | Farhangi et al. | |
| 7,045,913 B2 | 5/2006 | Ebrahim et al. | |
| 7,053,590 B2 | 5/2006 | Wang | |
| 7,062,917 B2 | 6/2006 | Wunning et al. | |
| 7,093,445 B2 | 8/2006 | Corr, II et al. | |
| 7,096,671 B2 | 8/2006 | Bland et al. | |
| 7,117,676 B2 | 10/2006 | Farhangi et al. | |
| 7,117,694 B2 | 10/2006 | Braun et al. | |
| 7,121,097 B2 | 10/2006 | Yee et al. | |
| 7,124,589 B2 | 10/2006 | Neary | |
| 7,140,188 B2 | 11/2006 | Hosokawa et al. | |
| 7,168,949 B2 | 1/2007 | Zinn et al. | |
| RE39,596 E | 5/2007 | Dodge et al. | |
| 7,425,127 B2 | 9/2008 | Zinn et al. | |
| 7,430,869 B2 | 10/2008 | Su et al. | |
| 2002/0060556 A1 | 5/2002 | Wall | |
| 2002/0063479 A1 | 5/2002 | Mitchell et al. | |
| 2002/0066270 A1 | 6/2002 | Rouse et al. | |
| 2002/0067872 A1 | 6/2002 | Weissert | |
| 2002/0069648 A1 | 6/2002 | Levy et al. | |
| 2002/0078694 A1 | 6/2002 | Nazeer et al. | |
| 2002/0079760 A1 | 6/2002 | Vessa | |
| 2002/0084702 A1 | 7/2002 | Balas | |
| 2002/0096393 A1 | 7/2002 | Rouse | |
| 2002/0096959 A1 | 7/2002 | Qin et al. | |
| 2002/0097928 A1 | 7/2002 | Swinton et al. | |
| 2002/0104316 A1 | 8/2002 | Dickey et al. | |
| 2002/0125779 A1 | 9/2002 | Qin et al. | |
| 2002/0128076 A1 | 9/2002 | Lubell | |
| 2002/0166324 A1 | 11/2002 | Willis et al. | |
| 2003/0102730 A1 | 6/2003 | Balas | |
| 2003/0110773 A1 | 6/2003 | Rouse et al. | |
| 2003/0111842 A1 | 6/2003 | Gilbreth et al. | |
| 2003/0157395 A1 | 8/2003 | Ren et al. | |
| 2003/0192318 A1 | 10/2003 | Sprouse et al. | |
| 2003/0192319 A1 | 10/2003 | Sprouse et al. | |
| 2004/0003598 A1 | 1/2004 | Farhangi | |
| 2004/0011523 A1 | 1/2004 | Sarada | |
| 2004/0021235 A1 | 2/2004 | Corr et al. | |
| 2004/0040312 A1 | 3/2004 | Hoffjann et al. | |
| 2004/0074223 A1 | 4/2004 | Willis et al. | |
| 2004/0100101 A1 | 5/2004 | Willis et al. | |
| 2004/0103669 A1 | 6/2004 | Willis et al. | |
| 2004/0119291 A1 | 6/2004 | Hamrin et al. | |
| 2004/0129188 A1 | 7/2004 | Traina | |
| 2004/0148942 A1 | 8/2004 | Pont et al. | |
| 2004/0160061 A1 | 8/2004 | Rouse et al. | |
| 2004/0167270 A1 | 8/2004 | Chang et al. | |
| 2004/0178641 A1 | 9/2004 | Wall | |
| 2004/0255588 A1 | 12/2004 | Lundberg et al. | |
| 2005/0076648 A1 | 4/2005 | Farhangi | |
| 2005/0196714 A1 | 9/2005 | Carroni et al. | |
| 2005/0201909 A1 | 9/2005 | Carroni et al. | |
| 2006/0016195 A1 | 1/2006 | Dalla Betta et al. | |
| 2006/0037432 A1 | 2/2006 | Deevi et al. | |
| 2006/0049080 A1 | 3/2006 | Bacha et al. | |
| 2006/0052499 A1 | 3/2006 | Chang et al. | |
| 2006/0054318 A1 | 3/2006 | Sarada | |
| 2006/0063845 A1 | 3/2006 | O'Rear et al. | |
| 2006/0063869 A1 | 3/2006 | Chang et al. | |
| 2006/0063870 A1 | 3/2006 | Chang et al. | |
| 2006/0074134 A1 | 4/2006 | O'Rear et al. | |
| 2006/0080968 A1 | 4/2006 | Griffin et al. | |
| 2006/0096294 A1 | 5/2006 | Farhangi et al. | |
| 2006/0096297 A1 | 5/2006 | Griffin et al. | |
| 2006/0138022 A1 | 6/2006 | Miller et al. | |
| 2006/0138024 A1 | 6/2006 | Miller et al. | |
| 2006/0150635 A1 | 7/2006 | Su et al. | |
| 2006/0196807 A1 | 9/2006 | Rosenbaum et al. | |
| 2006/0199743 A1 | 9/2006 | Rosenbaum et al. | |
| 2006/0202059 A1 | 9/2006 | Carroni et al. | |
| 2006/0213183 A1 | 9/2006 | Althaus | |
| 2006/0260308 A1 | 11/2006 | Ingersoll | |
| 2006/0272331 A1 | 12/2006 | Bucker et al. | |
| 2007/0054226 A1 | 3/2007 | Carroni et al. | |
| 2007/0240425 A1 | 10/2007 | Malavasi et al. | |
| 2009/0100820 A1 | 4/2009 | Prabhu | |
| 2009/0100821 A1 | 4/2009 | Prabhu | |
| 2010/0139282 A1 | 6/2010 | Prabhu | |
| 2010/0275611 A1 | 11/2010 | Prabhu | |
| 2010/0319355 A1 | 12/2010 | Prabhu | |

FOREIGN PATENT DOCUMENTS

| | | |
|---|---|---|
| JP | 11-13483 A | 1/1999 |
| WO | WO-96/14370 A2 | 5/1996 |
| WO | WO-01/92702 A1 | 12/2001 |

OTHER PUBLICATIONS

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

* cited by examiner

PROCESSING FUEL AND WATER

CROSS-REFERENCE TO RELATED APPLICATIONS

This application claims priority benefit from U.S. Provisional Application Ser. No. 61/313,995, filed on Mar. 15, 2010, entitled "Oxidizing Fuel Mixed with Water," the entire contents of which is hereby incorporated by reference.

BACKGROUND

In a conventional gas turbine system, fuel is combusted as it is injected into pressurized air, thereby heating and increasing thermal energy of the gas. The energy is then extracted from the heated gas with a turbine which converts thermal energy into kinetic energy. The kinetic energy may be used to drive another device, for example, a generator. The combustion process is often initiated by an ignition source (e.g. a spark plug). Due to the high temperature of the ignition source and the high concentration of the fuel as it enters the air, the combustion is very rapid and nearly instantaneous.

SUMMARY

In a general aspect, fuel is oxidized in a reaction chamber that contains water. In some implementations, energy released from oxidizing the fuel powers a gas turbine. Liquid fuels, such as ethanol, mixed with substantial quantities of water are not typically amenable to instantaneous combustion because the latent heat required to evaporate the water quenches the combustion process.

In some aspects a liquid comprising water is evaporated to form a gas including the water. The water is communicated into a reaction chamber, and the reaction chamber contains the water, fuel, and air at a pressure above an ambient pressure, for example, above an ambient pressure about an exterior of the reaction chamber. The fuel is oxidized with the air in the presence of the water in the pressurized reaction chamber.

Implementations may include one or more of the following features. Communicating the water into the pressurized reaction chamber includes communicating the liquid into the pressurized reaction chamber. Evaporating the liquid includes evaporating the liquid in the pressurized reaction chamber. An air/fuel mixture including the air and the fuel is communicated into the pressurized reaction chamber. The liquid further includes the fuel, evaporating the liquid includes evaporating the fuel and the water, and the gas includes the evaporated fuel and the evaporated water. The fuel includes ethanol, kerosene, and/or other types of fuel. The liquid includes more than fifty percent water by volume, or the liquid includes more than fifty percent fuel by volume. Communicating the water into the pressurized reaction chamber includes communicating the evaporated fuel and the evaporated water into the pressurized reaction chamber. Evaporating the liquid includes evaporating the fuel and the water by mixing the liquid with heated air. Communicating the water into the pressurized reaction chamber includes communicating the heated air, the evaporated fuel and the evaporated water into the pressurized reaction chamber. Fuel gas, formed by evaporating liquid fuel, is combined with the evaporated water and/or air. Communicating the water into the reaction chamber includes communicating the mixture of fuel gas, the evaporated water, and/or air into the reaction chamber. Oxidizing the fuel generates an oxidation product gas. The oxidation product gas is expanded in a gas turbine, which drives a generator. Landfill gas is received from a landfill prior to evaporating the liquid. The landfill gas is condensed to form the liquid that is later evaporated. The landfill gas includes the fuel, and condensing the liquid separates the water from the fuel. The liquid includes toxic material. Communicating the water into the pressurized reaction chamber includes communicating the toxic material into the reaction chamber.

In some aspects, a system includes an evaporator and a reaction chamber. The evaporator evaporates a liquid including water and fuel to form a gas including the water and the fuel. The evaporator includes an evaporator inlet arranged to receive the liquid and an evaporator outlet arranged to communicate the gas from the evaporator. The reaction chamber is configured to oxidize the fuel with air at a pressure above an ambient pressure about the reaction chamber. The reaction chamber includes a reaction chamber inlet in communication with the evaporator outlet to receive the gas including the water and the fuel.

Implementations may include one or more of the following features. The system includes a turbine having a turbine inlet in fluid communication with an outlet of the reaction chamber. The turbine is configured to receive an output gas from the reaction chamber and convert thermal energy of the output gas to mechanical energy by expanding the output gas between the turbine inlet and a turbine outlet. The system includes a generator mechanically coupled to the turbine. The generator is configured to convert the mechanical energy to electrical energy. The system includes a landfill well that receives landfill fluids from a landfill. The liquid includes at least a portion of the landfill fluids. The system includes a condenser that receives the landfill fluids from the landfill well and condenses the liquid from the landfill fluids.

In some aspects, an oxidation reaction chamber includes a first inlet arranged to receive a liquid including water and to communicate the liquid into the reaction chamber. The reaction chamber includes a second inlet arranged receive a gas including air and to communicate the gas into the reaction chamber. The reaction chamber is configured to evaporate the liquid in the reaction chamber to form a gas mixture including the water, the air, and fuel. The reaction chamber is configured to oxidize the fuel with the air in the reaction chamber.

Implementations may include one or more of the following features. The liquid includes the fuel. The gas includes the fuel. The reaction chamber includes a third inlet arranged to communicate the fuel into the reaction chamber. The reaction chamber includes an outlet in fluid communication with a turbine.

Described herein are methods and embodiments for the injection of water or steam into gas turbine systems. Combusted gas in gas turbines can increase output of the turbines. However, do so can increase the amount of fuel combusted and lead to greater temperatures, which results in increased formation of harmful NOx gas. In some embodiments, by providing water or steam into the system, the gradual oxidation system described herein can provide oxidation of fuels without increasing NOx formation while increasing output of the system.

Some embodiments describe that the fuel of the systems is oxidized by a flameless gradual oxidation process as an air/fuel mixture flows along the flow path in the reaction chamber. The fuel is preferably oxidized at a temperature sufficiently low to reduce or prevent formation and/or emission of harmful compounds, such as nitrogen oxides, and at a temperature sufficiently high to oxidize the fuel and other contaminants that are introduced into the chamber. The air/fuel mixture flows through the reaction chamber and absorbs heat from the interior surface of the reaction chamber and fill material contained within the chamber. The air/fuel mixture gradually increases in temperature as the mixture flows through the reaction chamber. When the temperature of the air/fuel mixture reaches or exceeds an auto-ignition temperature of the fuel, the fuel undergoes an exothermic oxidation reaction.

Many embodiments described herein contemplate adding steam or water to the system for one or more of many reasons (e.g., to reduce likelihood of combustion, to control temperature, to increase efficiency and/or output, etc.). This operation is distinct, as described further herein, from the introduction of water or steam in combustion systems.

Some methods described herein include evaporating a liquid comprising water to form a gas comprising the water; communicating the water into a reaction chamber that is pressurized above an ambient pressure about an exterior of the reaction chamber; and oxidizing fuel with air in the pressurized reaction chamber containing the air, the fuel, and the water while maintaining a maximum temperature of the fuel in the reaction chamber below a temperature that causes formation of nitrogen oxides.

In some methods, communicating the water into the pressurized reaction chamber includes communicating the liquid into the pressurized reaction chamber, and wherein evaporating the liquid comprises evaporating the liquid in the pressurized reaction chamber. Some methods further include communicating into the pressurized reaction chamber an air/fuel mixture comprising the air and the fuel. In some instances, the liquid further comprises the fuel, evaporating the liquid comprises evaporating the fuel and the water, and the gas comprises the evaporated fuel and the evaporated water.

In some methods, the fuel comprises at least one of ethanol or kerosene. In some instances, the liquid comprises more than fifty percent water by volume. In some methods, communicating the water into the pressurized reaction chamber comprises communicating the gas comprising the evaporated fuel and the evaporated water into the pressurized reaction chamber, and the method further comprising communicating the air into the pressurized reaction chamber.

Some methods further include mixing the air with the gas comprising the evaporated fuel and the evaporated water, wherein communicating the water into the pressurized reaction chamber comprises communicating a mixture comprising the air, the evaporated fuel and the evaporated water into the pressurized reaction chamber. In some methods, communicating the water into the pressurized reaction chamber comprises communicating the liquid into the pressurized reaction chamber, and evaporating the liquid comprises evaporating the liquid in the pressurized reaction chamber.

In some methods, the liquid further comprises the fuel, evaporating the liquid comprises evaporating the fuel and the water by mixing the liquid with heated air, and wherein the gas comprises the heated air, the evaporated fuel and the evaporated water. In some instances, communicating the water into the pressurized reaction chamber comprises communicating the gas comprising the heated air, the evaporated fuel and the evaporated water into the pressurized reaction chamber.

Some methods provide that oxidizing the fuel generates an oxidation product gas, the method further comprising expanding the oxidation product gas in a gas turbine. In some methods, expanding the oxidation product gas in the gas turbine drives a generator mechanically coupled to the gas turbine.

Some methods further include receiving a landfill gas from a landfill prior to evaporating the liquid and condensing the liquid from the landfill gas. In some methods, the landfill gas comprises the fuel. In some methods, the liquid comprises contaminants, and communicating the water into the pressurized reaction chamber comprises communicating the contaminants into the reaction chamber, and wherein the contaminants are oxidized in the reaction chamber.

In some embodiments described herein, systems are disclosed that include an evaporator that evaporates a liquid comprising water to form a gas comprising the water, the evaporator having an evaporator inlet arranged to receive the liquid and an evaporator outlet arranged to communicate the gas from the evaporator. The systems can further include a reaction chamber comprising a reaction chamber inlet in fluid communication with the evaporator outlet to receive the gas, the reaction chamber configured to oxidize fuel with air while containing the fuel, air, and gas at a pressure above an ambient pressure about the reaction chamber and while maintaining a maximum temperature in the reaction chamber below a temperature that causes formation of nitrogen oxides.

In some embodiments, the liquid further includes the fuel in a liquid state and the gas further comprising the fuel in a gaseous state. Some embodiments provide the reaction chamber further comprises one or more additional reaction chamber inlets arranged to receive at least one of the fuel or the air. Some embodiments further include a turbine having a turbine inlet in fluid communication with an outlet of the reaction chamber the turbine configured to receive an oxidation product from the reaction chamber and convert thermal energy of the oxidation product to mechanical energy by expanding the oxidation product between the turbine inlet and a turbine outlet. Some embodiments further include a generator mechanically coupled to the turbine, the generator configured to convert the mechanical energy to electrical energy.

Some embodiments described herein disclose an oxidation reaction chamber having a first inlet arranged to communicate a liquid comprising water into an interior volume of the reaction chamber; a second inlet arranged to communicate a gas comprising air into the interior volume, the reaction chamber adapted to oxidize fuel with the air in the interior volume while maintaining a maximum temperature in the reaction chamber below a temperature that causes formation of nitrogen oxides; and an outlet arranged to communicate an output gas from the interior volume, the output gas comprising the water and an oxidation product gas generated by oxidizing the fuel in the interior volume.

In some embodiments, the liquid further comprises the fuel, and in some embodiments, the gas further comprises the fuel. Some embodiments provide that the outlet is in fluid communication with a turbine inlet. In some embodiments, the liquid further comprises contaminants, and the maximum temperature in the reaction chamber is at or above an oxidation temperature of the contaminants. In some embodiments, the gas further comprises contaminants that may be oxidized within the reaction chamber and the temperature in the oxidation temperature at or above the temperature to oxidize the contaminants.

Some embodiments described herein include a gradual oxidation system having a fluid inlet; a compressor that receives and compresses fluid, comprising a first fuel mixture, from the fluid inlet; an injector that introduces a second fuel mixture into the fluid, the second fuel mixture comprising a liquid having a mixture of fuel and water, wherein water comprises between 50% and 80% of the second fuel mixture by volume; and a gradual oxidation chamber that receives the fluid from the compressor and that maintains a flameless oxidation process of the fluid within the chamber without a catalyst.

Some embodiments further include a turbine that receives the heated and compressed fluid from the gradual oxidation chamber and expands the fluid. In some embodiments, the injector introduces the second fuel mixture before the fluid is compressed by the compressor. In some embodiments, the injector introduces the second fuel mixture into the fluid after the fluid has been compressed and before the fluid is received into the gradual oxidation chamber. Some embodiments provide that the injector introduces the second fuel mixture into the gradual oxidation chamber.

Some embodiments further include a compressor that compresses the second fuel mixture prior to introducing the second fuel mixture into the gradual oxidation chamber. In some embodiments, the second fuel mixture comprises at least one of ethanol, gasoline, and petroleum distillates. In some embodiments, the second fuel mixture comprises a fuel-to-water mixture of about 25% fuel by volume. In some embodiments, the injector is configured to inject the second fuel mixture into the system as a liquid. In some embodiments, the injector is configured to inject the second fuel mixture into the system as a gas. Some embodiments provide that the ratio of fuel-to-water mixture of the second fuel mixture is based on a determination of the fuel-to-air mixture of the first fuel mixture, and some embodiments provide that the ratio of fuel-to-air mixture is based on a determined of the fuel-to-water mixture.

In some embodiments described herein, a gradual oxidation system includes a fluid inlet; a compressor that receives and compresses fluid, comprising a fuel mixture, from the fluid inlet; an injector that introduces steam into the fluid after the fluid has been compressed; a gradual oxidation chamber that receives the fluid from the compressor and that maintains a flameless oxidation process of the fluid within the chamber without a catalyst; and a turbine that receives the heated and compressed fluid from the gradual oxidation chamber and expands the fluid.

In some embodiments, the injector introduces steam before the fluid is compressed by the compressor. In some embodiments, the injector introduces steam into the fluid after the fluid has been compressed and before the fluid is received into the gradual oxidation chamber. Some embodiments provide that the injector introduces steam into the gradual oxidation chamber. Some embodiments further include a steam compressor that compresses the steam prior to introducing the steam into the gradual oxidation chamber.

Some methods described herein for gradually oxidizing a fuel mixture include aspirating air into a gradual oxidation system via a fluid inlet; mixing the air with fuel to form a fuel mixture; compressing the fuel mixture; injecting steam into the system to combine the steam with the fuel mixture; gradually oxidizing the fuel mixture in a gradual oxidation chamber that maintains a flameless oxidation process of the fluid without a catalyst; directing heated and compressed fluid from the gradual oxidation chamber to a turbine; and expanding the fluid with the turbine.

In some methods, the steam is injected into the system prior to the compressing of the fuel mixture. In some methods, the steam is injected into the system after the compressing of the fuel mixture and before the gradually oxidizing of the fuel mixture. In some methods, the steam is injected into gradual oxidation chamber.

Some methods disclosed herein for gradually oxidizing a fuel mixture include aspirating air into a gradual oxidation system via a fluid inlet; mixing the air with fuel to form a first fuel mixture; compressing the fuel mixture; injecting a second fuel mixture into the system to combine the second fuel mixture with the first fuel mixture, the second fuel mixture comprising a liquid having a mixture of fuel and water, wherein water comprises between 50% and 80% of the second fuel mixture by volume; and gradually oxidizing the first and second fuel mixtures in a gradual oxidation chamber that maintains a flameless oxidation process of the fluid without a catalyst.

Some methods further include directing heated and compressed fluid from the gradual oxidation chamber to a turbine and expanding the fluid with the turbine. In some methods, the second fuel mixture is injected into the system before the fluid is compressed by the compressor. In some methods, the second fuel mixture is injected into the system after the fluid has been compressed and before the fluid is received into the gradual oxidation chamber. In some methods, the second fuel mixture is injected into the gradual oxidation chamber. Some methods further include compressing the second fuel mixture with a compressor prior to introducing the second fuel mixture into the gradual oxidation chamber.

In some embodiments, the second fuel mixture comprises at least one of ethanol, gasoline, and petroleum distillates. In some embodiments, the second fuel mixture comprises a fuel-to-water mixture of about 25% fuel by volume. In some embodiments, the second fuel mixture is injected into the system as a liquid. In some embodiments, the second fuel mixture is injected into the system as a gas. Some embodiments further include determining the ratio of the fuel-to-air mixture of the first fuel mixture and adjusting the ratio of fuel-to-water mixture of the second fuel mixture based on first fuel mixture ratio.

The details of one or more embodiments of these concepts are set forth in the accompanying drawings and the description below. Other features, objects, and advantages of these concepts will be apparent from the description and drawings, and from the claims.

DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Fuels containing water are not compatible with some conventional combustion processes because water content of the fuel is non-combustible. Moreover, the water evaporates as the fuel ignites, and the latent heat of evaporation takes heat away from the combustion process. If the water content of the fuel is too high, combustion cannot occur. Ethanol, a common alcohol that can be derived from fruits, sugar cane, corn, cellulosic waste, and other sources, has been used as a renewable fuel, but the ethanol is typically produced by first producing a dilute mixture of ethanol and water and then separating water from the mixture. Water and ethanol are fully miscible, and separation of the water requires expensive distillation. Even distillation usually cannot remove all water from the ethanol, and special processes are typically needed to render the ethanol completely water-free. Similarly, oil/water mixtures from fuel tanks and waste water collection tanks are often shipped to water separation and/or destruction facilities for processing, which can be quite expensive. A gas turbine that can efficiently consume mixtures of fuel and water may reduce fuel consumption, fuel costs, clean-up requirements, and/or environmental impact. In some conventional systems, the latent heat of evaporation of liquid fuels and any entrained water reduces the efficiency of a gas turbine power cycle.

Figure 1:
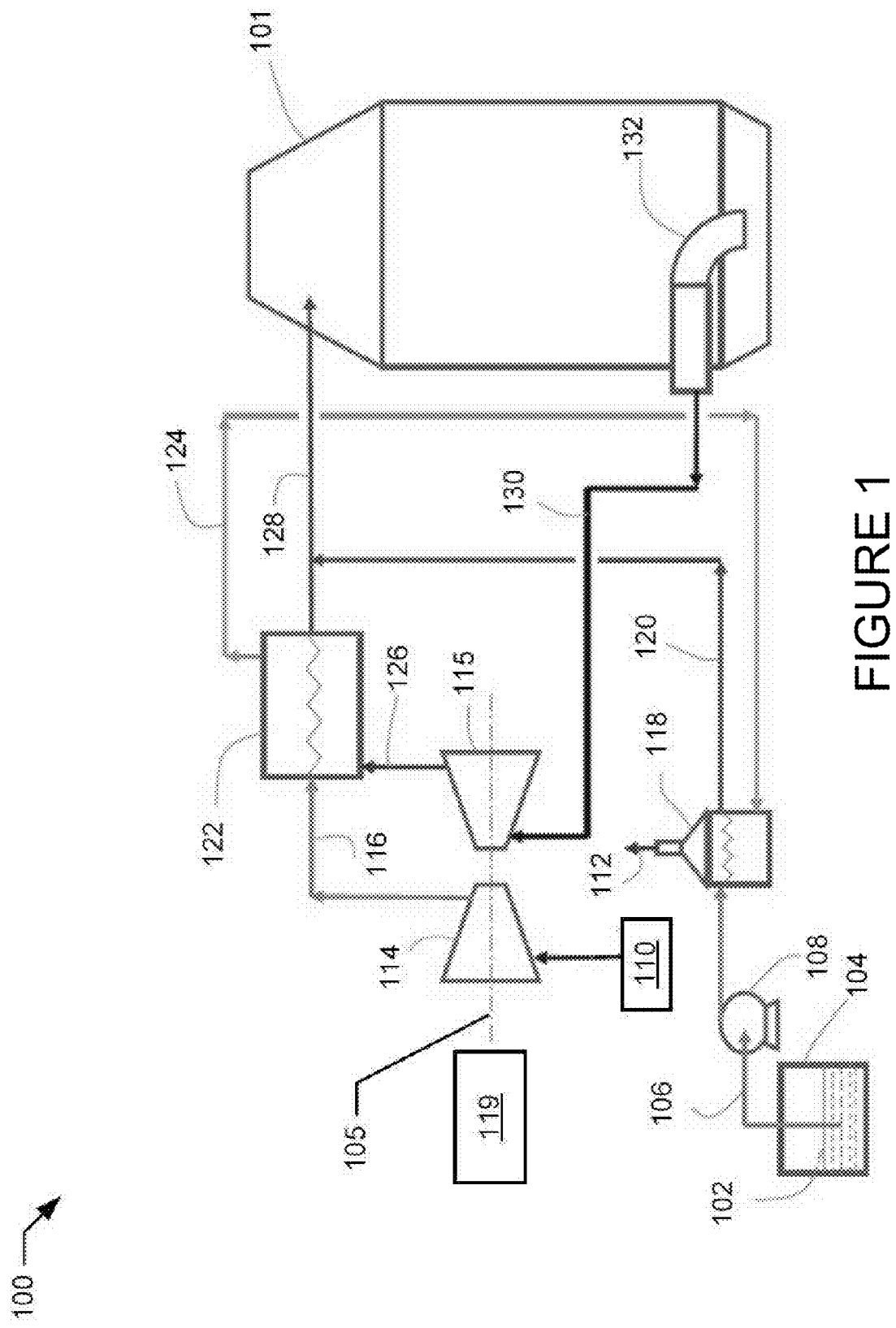
FIG. 1 is a diagram of embodiments of a gas turbine system.

In the example system 100 shown in FIG. 1, a fuel/water mixture 102 is stored in tank 104. The mixture may be pumped using pressurizing device 108 through a heat exchanger/evaporator 118. Exhaust hot gas leaving the heat exchanger 122 through pipe 124 is delivered to evaporator 118 where it evaporates the liquid fuel/water mixture. By evaporating the liquid fuel and water with surplus heat that would otherwise be vented to the atmosphere, the latent heat of evaporation is provided from a surplus heat source and thus does not significantly reduce system efficiency.

In some implementations, the overall system efficiency may be improved. For example, it is estimated that for many common liquid fuels (e.g., ethanol, gasoline, petroleum distillates, and/or others), a fuel/water mixture that has 25% of the fuel by volume can be evaporated with just the surplus heat available from the system exhaust. An additional benefit is that the evaporated water may increase the mass flow of the gas mixture, and therefore may also increase the power output of the turbine.

In some implementations, environmental impact may be reduced by reducing the emission of pollutants and/or other harmful materials. For example, the system 100 can oxidize fuel in a manner that reduces or eliminates emission of nitrogen oxides (NOx), carbon monoxide (CO), volatile organic compounds (VOCs), and/or other types of potentially harmful gases.

In some implementations, the system 100 can reduce or eliminate formation of nitrogen oxides by maintaining a maximum temperature of the fuel below 2300° F. during sustained operation (temperatures above 2300 degrees Fahrenheit (° F.) may cause nitrogen oxides to form). By controlling the temperature and the residence time inside the reaction chamber, a gas turbine system may generate exhaust gases having less than one part-per-million (ppm) carbon monoxide (CO) and/or less than one ppm nitrogen oxide (NOx). Some conventional systems generate exhaust having 15 ppm or more CO and/or 15 ppm or more NOx.

Some fuel/water mixtures (e.g., ethanol/water mixtures, biorefinery by-products, and others) are relatively simple to produce but require extra processing for some current power plants. Such fuels may be used directly in the system described here to generate power, and in some cases even more power than fuels that are not mixed with water. In some cases, a power plant can run on a fuel/water mixture that is mostly water. For example, the evaporated fuel/water mixture can be communicated into a reaction chamber that oxidizes the fuel, and the energy from oxidizing the fuel can drive a turbine.

In some instances, efficiency is further increased by using waste heat from the turbine to evaporate all or part the fuel/water mixture before communicating the fuel/water mixture into the reaction chamber. Moreover, the mass flow through the system may increase because of the steam generated from the water, which may lead to a further increase in system output. The increased output (without increasing the fuel input) may also increase efficiency. In some implementations, the water vapor from such a system increases the mass flow through the oxidizer by up to about 6%, with a resulting efficiency and potentially output gain of up to about 5%. For example, in a 200 kW system the increase in power can be about 12 kW with no increase in fuel consumption.

In some embodiments, a mixture of about 25% ethanol and about 75% water can be evaporated with the waste heat from a power plant, and the turbine system can process the resulting evaporated mixture to output energy. In some embodiments, the mixture may include about 20% ethanol and 80% water, and in even further embodiments, the mixture may include about 15% ethanol and about 85% water. In further embodiments, the mixture can include a higher content of water than about 85% and/or a lower content of ethanol than about 15%. In some embodiments, other fuels than ethanol may be used with the same or similar ratios.

FIG. 1 shows an example of a gas turbine system 100 that can utilize fuels mixed with water. The example system 100 includes an air source 110 (e.g., ambient air), a compressor 114, a turbine 115, a heat exchanger 122, a liquid tank 104, a pressurizing device 108, an evaporation chamber 118, and a reaction chamber 101. As shown in FIG. 1, the example system 100 may also include an electric power generator 119. In the example system shown, a shaft 105 mechanically couples the turbine 115 to the compressor 114 and the generator 119 (the combination of the turbine 115, compressor 114 and generator 119 being referred to as a turbine generator). A gas turbine system may include additional, fewer, and/or different components, which may be used in the same and/or a different manner.

The example air source 110 provides air for oxidation processes in the reaction chamber 101. Hydrocarbon fuels are oxidized when they are heated above their auto-ignition temperature in the presence of oxygen. The air source 110 provides gas containing oxygen, which is mixed with the fuel to oxidize the fuel. The air source 110 can provide air from the atmosphere surrounding the system 100. Air from the air source 110 may contain oxygen at any concentration sufficient for the oxidation of the fuel. Air from the air source 110 may include other gases in addition to oxygen gas. For example, the air may include nitrogen, argon, and/or other reactive or non-reactive gases.

Air from the air source 110 can be communicated to the compressor 114. In the example system 100 shown in FIG. 1, the example compressor 114 receives air from the air source 110 through a compressor inlet, compresses the received air, and communicates the compressed air through a compressor outlet. The compressor 114 may receive mechanical rotational energy from the turbine 115 through the shaft 105. The compressor 114 can utilize the mechanical rotational energy from the turbine 115 to increase the pressure of the air/fuel mixture in the compressor 114. In some implementations, the system 100 may include a compressor that operates in a different manner. The example shaft 105 transfers rotational energy from the turbine 115 to the compressor 114 and the generator 119. In some implementations, the shaft 105 may include multiple shafts. For example, a first shaft may transfer energy from the turbine 115 to the compressor 114, and a second shaft may transfer energy from the turbine to the generator 119.

The compressed air can be communicated from the compressor 114 to the heat exchanger 122. The compression process heats the air, and the heat exchanger 122 can further heat the air. The example heat exchanger 122 receives the compressed air from the compressor 114, heats the compressed air, and communicates the heated, compressed air to the reaction chamber 101. The heat exchanger 122 may also receive exhaust gas from the turbine 115. The heat exchanger 122 may use heat from the exhaust gas to pre-heat the compressed air. For example, the exhaust gas and the air/fuel mixture may contact opposite sides of a heat-transfer structure while flowing through the heat exchanger 122. The heat-transfer structure may conduct thermal energy from the higher temperature exhaust gas to the lower temperature air. In some implementations, the system 100 may include a heat exchanger that operates in a different manner. For example, the system 100 may pre-heat the air using heat from a different source, or the system 100 may communicate the air into the reaction chamber 101 without pre-heating the mixture.

The air may be mixed with fuel to form an air/fuel mixture prior to communicating the air and fuel into the reaction chamber 101. Generally, the air may be combined with fuel at any point in the system 100. For example, fuel may be mixed with the air prior to communicating the air into the compressor 114, prior to communicating the air into the heat exchanger 122, prior to communicating the air into the reaction chamber, and/or after communicating the air into the reaction chamber 101. In the example shown in FIG. 1, air is mixed with fuel in the conduit 128 between the heat exchanger 122 and interior of the reaction chamber 101. The fuel received in the conduit 128 includes gaseous fuel formed by evaporating a liquid mixture 102 in the evaporation chamber 118. In some instances, the air and fuel may be mixed at an inlet into the reaction chamber.

In the example shown, a fluid tank 104 contains the liquid mixture 102, which includes liquid fuel and liquid water. The fluid tank 104 may contain additional and/or different gas, liquid, and/or solid substances. The fluid tank 104 may include any type of liquid storage system or container, of any suitable size or configuration. The fluid tank 104 may include inlets and/or outlets that provide fluid communication into and/or out of the fluid tank 104. In some examples, the liquid mixture 102 includes liquid ethanol, liquid kerosene, and/or another type of liquid fuel. The liquid mixture 102 may include water from any water source.

In some implementations, the water in the liquid mixture 102 includes contaminants, particulates, toxic materials, and/or other types of substances. Generally, the liquid mixture 102 may have any ratio of water and fuel. In some examples, the liquid mixture 102 includes a low percentage of liquid fuel (e.g., 25% and in some examples, the liquid mixture 102 includes a higher percentage of liquid fuel (e.g., 30%, 40%, 50%, 60%, 70%, 80%, 90% or more). In some examples, the liquid mixture 102 includes a low percentage of liquid water (e.g., 20%, 10%, or less); and in some examples, the liquid mixture 102 includes a higher percentage of liquid water (e.g., 30%, 40%, 50%, 60%, 70%, or more). The reaction chamber 101 is preferably configured to oxidize the fuel, contaminants, particulates, toxic materials, and or other types of substances sufficiently to render the exhaust gases or products harmless. For example, in some embodiments, these substances are broken down into at least $CO_2$, $H_2O$, and $O_2$. In some embodiments, the substances are broken down into substantially only $CO_2$, $H_2O$, and $O_2$.

In some cases, the liquid mixture 102 may include only the liquid fuel and liquid water, with no other material in the mixture 102. The liquid mixture 102 may include other materials in addition to the liquid fuel and liquid water. For example, the liquid mixture 102 may include additional and/or different liquids, gases, and/or solids. In some cases, additional water can be added to the liquid mixture 102 to boost the power output of the gas turbine system 100.

The liquid mixture 102 may include fluids from a fluid source. Many different types of fluid source are contemplated. Some example fluid sources include wine-making facilities, ethanol production facilities, landfills, alcohol production facilities, oil refineries, steel mills, chemical plants, oil fields, restaurants, and/or other sources of liquid fuel and/or liquid water.

The liquid mixture 102 can be communicated from the fluid tank 104 into the evaporation chamber 118. In the example system 100 shown, a conduit 106 and a pressurizing device 108 provide fluid communication between an outlet of the fluid tank 104 and an inlet of an evaporation chamber 118. The pressurizing device 108 can be a pump or another type of device that induces fluid flow from the tank 104 into the evaporation chamber 118. The evaporation chamber 118 may include a heat exchanger or another type of heating device that increases the temperature of the liquid mixture 102.

The increase in temperature of the liquid mixture may increase the rate at which the liquids in the evaporation chamber 118 evaporate. Exhaust from the turbine system 100 and/or other sources of heat energy may be used to heat the liquids in the evaporation chamber 118. In the example shown, a conduit 124 provides heat energy to the evaporation chamber 118 from the heat exchanger 122. After imparting heat energy to the evaporation chamber 118, the exhaust may be vented to the atmosphere through the outlet 112.

The liquid mixture 102 evaporates in the evaporation chamber 118 to form a gas mixture. The gas mixture generated in the evaporation chamber 118 may include fuel vapors from the liquid fuel in the mixture 102 and/or water vapors from the liquid water in the mixture 102. For example, heating a liquid mixture of ethanol and water mixture can evaporate both the ethanol and the water. The ratio of the evaporated substances may be based on partial pressures.

Evaporating the liquid mixture 102 may include evaporating water to form a gas mixture that includes gaseous water, and evaporating the liquid mixture 102 may include evaporating fuel to form a gas mixture that includes gaseous fuel. The gas mixture may include any gaseous state, such as a vapor state and/or another type of gaseous state generated by an evaporation process. For example, the gas mixture can include a vaporized liquid, such as water vapor and/or fuel vapor, resulting from any type of vaporization process. In a vapor state, the partial pressure of the vapor can be at or above the boiling point pressure, and/or the temperature of the vapor can be at or above the boiling point temperature. The gas mixture may be below the boiling point temperature and/or boiling point pressure.

The evaporation process for a liquid may include a liquid-to-gas phase transition at a temperature below the boiling point of the liquid. The evaporation process may include additional and/or different types of vaporization processes. For example, in some instances, the evaporation process may include boiling and/or other thermodynamic processes that form a gas from a liquid. Heat for evaporating the liquid mixture 102 may be provided partially or entirely by exhaust gas from the heat exchanger 122. In addition to the fuel and/or water, the gas mixture formed in the evaporation chamber 118 may also include other materials. For example, vapors from the liquid mixture 102 may be mixed with additional and/or different liquids, gases, and/or solids.

The gas mixture formed in the evaporation chamber 118 may be communicated into the reaction chamber 101. In the example shown in FIG. 1, the gas mixture that includes the evaporated water and the evaporated fuel is communicated into the conduit 120, and from the conduit 120 into the conduit 128 to be mixed with the compressed and pre-heated air from the heat exchanger 122. Because the evaporation chamber 118 in FIG. 1 generates a gaseous mixture of fuel and water, mixing the output from the evaporation chamber 118 with the air in the conduit 120 forms a gas-phase mixture of air, fuel, and water. The air/fuel/water mixture may have a low concentration of fuel, for example, below the lower explosive limit (LEL) concentration for the fuel.

The mixture may have a low heating value, for example, approximately 15 btu/scf or lower, or the mixture may have a higher heating value. The mixture may be a non-combustible mixture, for example, unable to sustain an open flame. In some implementations, the fuel evaporated from the liquid mixture 102 is sufficient to sustain operation of the system 100.

The system 100 may additionally include a mixer (not shown) that can mix the air with the evaporated mixture of fuel and water. The air may be mixed with the fuel and water without a mixer device, for example, by injecting the evaporated mixture fuel into a stream of air. In some examples, air, fuel, water, and/or other substances may be mixed at additional and/or different points in the system 100. For example, air from the air source 110 may be combined with additional fuel prior to communicating the air into the compressor 114. In some instances, the reaction chamber 101 may include an air inlet that introduces air from the air source 110 directly into the reaction chamber 101. In some implementations, the air may be introduced into the reaction chamber 101 as a control flow, for example, to cool regions of high temperature in the reaction chamber 101. In some implementations. the air and the evaporated mixture may be communicated separately into the reaction chamber 101 to form an air/fuel/water mixture in the reaction chamber 101.

The reaction chamber 101 retains the air and fuel as the fuel oxidizes. Oxidation of the fuel in the reaction chamber 101 may be initiated by raising the fuel to or above an auto-ignition temperature of the fuel. The system 100 may initiate oxidation in the reaction chamber 101 independent of oxidation catalyst materials (e.g., platinum) and/or independent of an ignition source (e.g., a flame or spark). Fuel may be oxidized with air in the reaction chamber 101 without raising the temperature of the air/fuel mixture above a threshold temperature, for example, by maintaining the maximum temperature of the fuel in the reaction chamber below the threshold temperature.

The threshold temperature may be determined based on one or more factors, for example, the threshold temperature can be a recommended or maximum operating temperature of the turbine, a recommended or maximum inlet temperature for the turbine, a temperature that causes formation of nitrogen oxides, a temperature selected based on the flow rate of the fuel through the reaction chamber 101, and/or other factors.

In some implementations, fuel is oxidized in the reaction chamber 101 below a temperature that causes formation of nitrogen oxides. As such, the reaction chamber 101 can oxidize virtually all of the fuel while producing only minimal amounts of nitrogen oxides. For example, exhaust gas from the system 100 may include less than one part per million of each of nitrogen oxide, VOCs and CO, and may even reduce the concentrations of VOCs and CO contained in the incoming air.

The reaction chamber 101 may include an internal volume lined with insulating refractory material. High temperature heat-absorbing and/or heat-resistant material, such as ceramic or rock, called fill material, may be provided in the reaction chamber 101. The fill material may have a thermal mass that facilitates slow oxidation of weak fuels flowing through the reaction chamber 101. The thermal mass may help stabilize temperatures for gradual oxidation of the fuel by transmitting heat to the incoming gases and receiving heat from the oxidized gases.

In some cases, the thermal mass of refractory materials in the reaction chamber 101 may act as a dampener, absorbing heat and preventing excessive temperatures that could damage the turbine and/or produce unwanted byproducts (e.g., nitrogen oxides, carbon dioxides, volatile organic compounds and/or others). In some cases, the thermal mass of the refractory materials in the reaction chamber 101 may provide a temporary source of heat energy, which may help sustain oxidation of the fuel.

The volume and shape of the reaction chamber 101, and the configuration of the overall system, can be designed to provide a controlled flow and flow rate through the chamber, allowing sufficient dwell time for complete fuel oxidation. The flow path can be sufficiently long that a flow rate of the air and fuel mixture along the flow path, averaged over the length of the flow path, allows the fuel to oxidize to completion. As an example, the average dwell time of the gas in the chamber can be greater than or equal to one second in some cases. The average dwell time of the gas in the chamber can be less than one second in some cases. In some embodiments, the dwell time of the gas in the chamber can range from about 0.1 sec. to about 10 sec. In some embodiments, the dwell time of the gas in the chamber can range from about 0.5 sec. to about 5 sec. In some embodiments, the dwell time of the gas in the chamber can range from about 0.5 sec. to about 2 sec. In some embodiments, the dwell time of the gas in the chamber can range from about 0.5 sec. to about 1 sec. In some embodiments, the dwell time of the gas in the chamber can range from about 1 sec. to about 2 sec. In some embodiments, the dwell time of the gas in the chamber can be less than about 0.1 sec. or more than about 10 sec. The rate of oxidation of the mixture is a function of the constituents of the fuel, fuel concentration, oxygen concentration, pressure, temperature and other factors. Thus, the rate of oxidation can be adjusted by adjusting these parameters accordingly.

The reaction chamber 101 may also include one or more sensors for detecting properties such as temperature, pressure, flow rate, or other properties relevant to the startup and/or operation of the gas turbine system 100. The reaction chamber 101 may also include internal structures and/or devices that control aspects of the oxidation process. For example, the reaction chamber 101 may include flow diverters, valves, and/or other features that control temperature, pressure, flow rate, and/or other aspects of fluids in the reaction chamber.

The reaction chamber 101 may include one or more inlets. Each of the inlets may communicate air, fuel, water, or any combination of these into the reaction chamber. For example, the gaseous fuel/water mixture from the evaporation chamber 118 may be communicated directly into the reaction chamber 101. In some implementations, the liquid mixture 102 may be communicated directly into the reaction chamber 101 in a liquid state. The reaction chamber 101 includes one or more outlets that communicate oxidized fuel and/or other materials to the turbine 115.

In the example shown, an exhaust pipe 132 communicates exhaust to an inlet of the turbine 115 through a conduit 130. During a heating process and/or during sustained operation, the gas exiting the reaction chamber 101 through the outlets may include completely oxidized fuel products, non-reactive gases, and only trace amounts of nitrogen oxides and carbon dioxide. In some instances, the gas exiting the reaction chamber 101 through the outlets may include more than trace amounts of unoxidized fuel, nitrogen oxides, carbon dioxide, and/or other materials.

In operation, the reaction chamber 101 may be pressurized, for example, above an atmospheric pressure and/or above an ambient pressure about the exterior of the reaction chamber 101. Pressure in the reaction chamber may be provided by the compressor 114 and/or another pressurizing device. In some instances, the pressure in the pressurized reaction chamber 101 is more than two pounds per square inch gauge (i.e., more than two pounds per square inch above the ambient pressure about the exterior of the reaction chamber). In some instances, the pressure in the reaction chamber 101 is ten to fifty pounds per square inch gauge during operation.

Materials communicated into the pressurized reaction chamber 101 can be introduced into the reaction chamber 101 at a high pressure, e.g., a pressure higher than the pressure inside the reaction chamber 101. For example, the air, fuel, and/or water may be introduced into the pressurized reaction chamber 101 at or above the internal pressure of the reaction chamber 101. The high pressure in the reaction chamber 101 induces fluid communication from the reaction chamber into the turbine 115, which allows output gas from the reaction chamber 101 to power the turbine.

The turbine 115 converts energy of the oxidation product gas to rotational mechanical energy. The example turbine 115 receives the oxidized fuel through a turbine inlet, expands the oxidized fuel between the turbine inlet and a turbine outlet, and communicates the expanded gas through the turbine outlet. The turbine 115 may transmit mechanical rotational energy to the compressor 114 through the shaft 105. The turbine 115 may transmit mechanical rotational energy to the generator 119 through the shaft 105. In some implementations, the system 100 may include a turbine that operates in a different manner.

The generator 119 converts rotational energy from the turbine 115 to electrical energy. For example, the generator 119 can output electrical power to a power grid or to a system that stores and/or operates on electrical power. In some implementations, the generator 119 may provide mechanical energy to the compressor 114 during startup. For example, the generator may be capable of operating in a motoring mode that converts electrical power to mechanical energy. In some instances, the system 100 may operate without providing energy to the generator 119. For example, the system 100 may operate as a thermal oxidizer to destroy fuel and/or other materials (e.g., materials in the liquid mixture 102) independent of outputting power.

In some aspects of operation of the example system 100, the reaction chamber 101 operates in a reactive state. The air source 110 provides air to the compressor 114. The compressor 114 compresses the air and communicates the compressed air to the heat exchanger 122. The heat exchanger 122 heats the compressed air. The liquid mixture 102, which includes liquid fuel and liquid water, is communicated into the evaporation chamber 118 through the pressurizing device 108. The liquid mixture 102 is evaporated in the evaporation chamber 118 to form a gas mixture. The gas mixture includes fuel and water both in a gas phase, which may include fuel and/or water vapor. The gas mixture is combined with the heated, compressed air in the conduit 128. The resulting mixture of air, fuel, and water is introduced into the reaction chamber 101. The mixture is heated and the fuel is oxidized in the reaction chamber 101.

In some implementations, the mixture remains in the reaction chamber 101 long enough to oxidize substantially all of the fuel in the mixture. In some cases, the heat released in the reaction chamber 101 by oxidizing the evaporated fuel from the liquid mixture 102 may provide sufficient heat energy to heat incoming fuel to the oxidation temperature while maintain the internal temperature of the reaction chamber 101 above the temperature required to oxidize the fuel and power the turbine 115.

Output gas, which includes the oxidation product gas and water, is communicated through the reaction chamber 101 to a reaction chamber outlet to the turbine 115. The temperature of the output gas exiting the reaction chamber may be approximately 1600° F. or higher, or the output gas may have a lower temperature. The output gas may be filtered prior to entering the turbine inlet. The oxidation product gas may be cooled with fluid (e.g., air and/or another gas or liquid) applied to the oxidation product prior to the turbine 115, for example, to prevent overheating the turbine 115.

The output gas powers the turbine 115, and the turbine 115 converts thermal energy of the output gas to rotational mechanical energy. The rotational mechanical energy of the turbine 115 drives the compressor 114 and/or the generator 119. The turbine 115 communicates the output gas from an outlet of the turbine 115 to the heat exchanger 122. The output gas provides heat energy to the heat exchanger 122. The output gas may also be communicated to the evaporation chamber 118 and provide heat energy to the evaporation chamber 118. The output gas exits the system, for example, through an exhaust stack.

Figure 2:
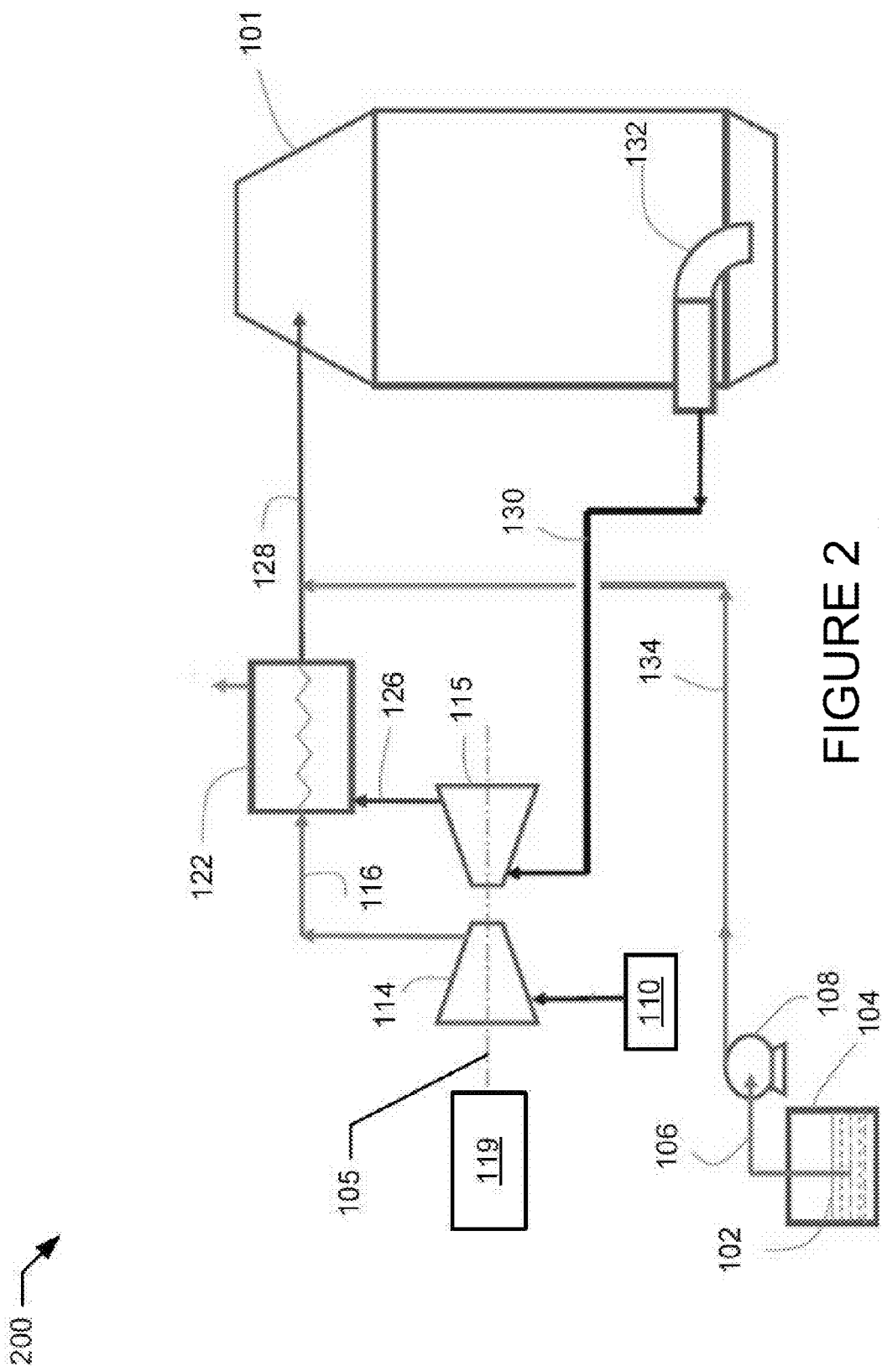
FIG. 2 is a diagram of further embodiments of a gas turbine system.

FIG. 2 shows a second example gas turbine system 200 that can utilize fuels that are mixed with water. In the example system 200, the liquid mixture 102 is introduced into the heated air stream in the conduit 128. The liquid mixture 102 is communicated from the tank 104 by the pressurizing device 108, and from the pressurizing device 108 through the conduit 134. The liquid mixture 102 in FIG. 2 is communicated from the conduit 134 into the conduit 128, where the liquid mixture 102 is mixed with heated air. The heat energy from the heated air in the conduit 128 evaporates the liquid mixture 102 to form a gas mixture. As such, the example system 200 does not require a separate evaporation chamber. The thermal energy in the air may be sufficient to evaporate the liquid mixture 102 prior to entering the reaction chamber 101. Other aspects of the system 200 may operate substantially as described with respect to the example system 100 in FIG. 1.

In FIG. 2, the liquid mixture 102 is shown entering the air stream downstream of heat exchanger 122. The liquid mixture 102 may additionally or alternatively be introduced upstream of the heat exchanger 122, provided the thermal energy in the air is sufficient to evaporate the mixture. While this approach may reduce the efficiency of the system, it may allow for even weaker fuel/water mixtures to be used. In addition, the exhaust heat at the outlet of the heat exchanger 122 is available for other applications.

Figure 3:
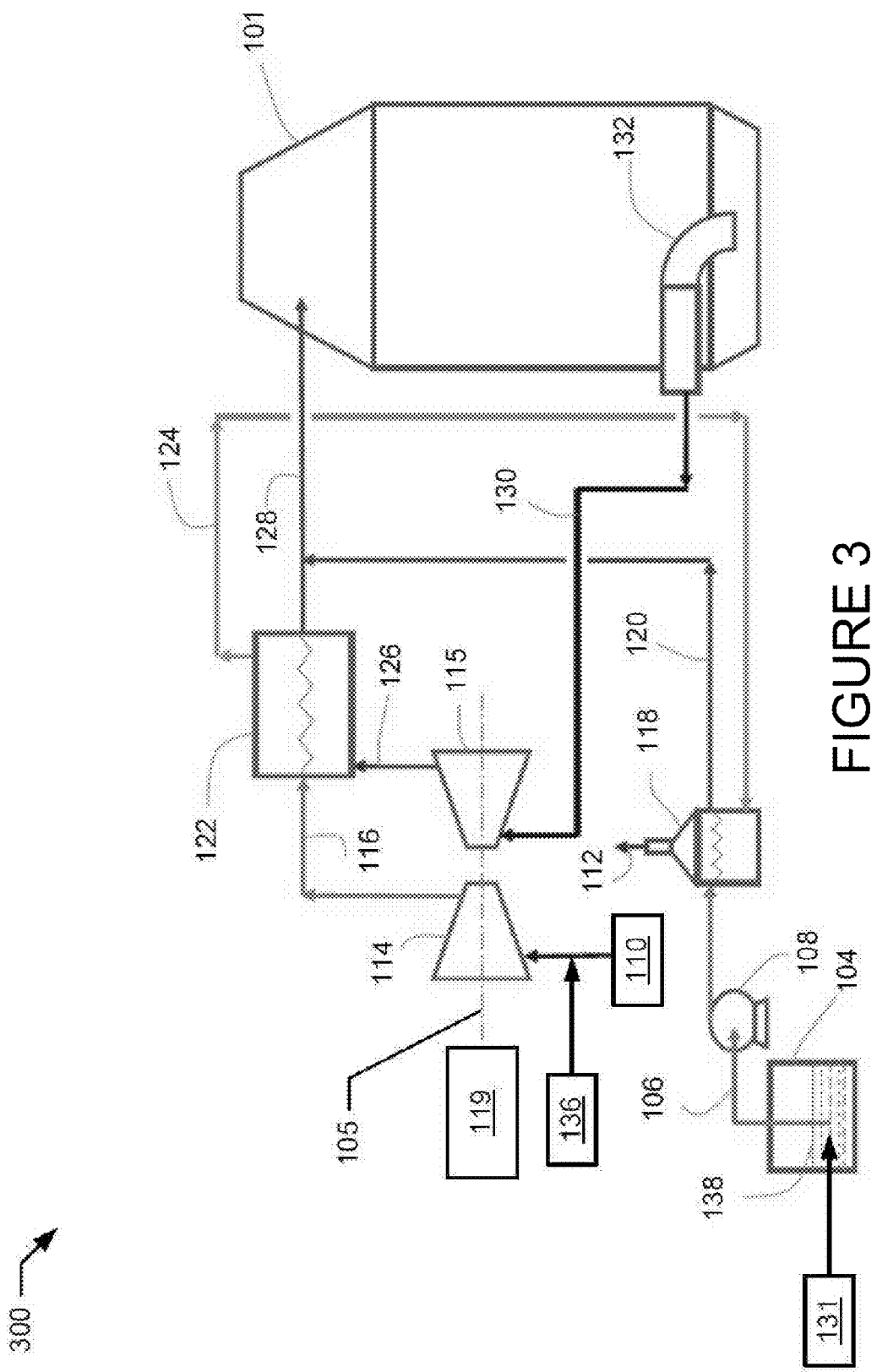
FIG. 3 is a diagram of further embodiments of a gas turbine system.

FIG. 3 shows an example of a gas turbine system 300 that can process liquids. The system 300 includes a fuel source 136 and a liquid source 131. The liquid mixture 138 in the fluid tank 104 includes liquid from the liquid source 131. In some implementations, the system 300 is powered by a combination of liquid fuel and gaseous fuel. For example, the gaseous fuel may be provided by the fuel source 136, and the liquid fuel may be provided by the liquid source 131. In some implementations, the system 300 is powered only or primarily by liquid fuel from the liquid source 131, and the fuel source provides little or no additional fuel. In some implementations, the system 300 is powered only or primarily by gaseous fuel from the fuel source 136, and the liquid source 131 provides little or no additional fuel.

The example fuel source 136 provides fuel to the system 300, in some instances, for sustaining an oxidation process in the reaction chamber 101 and/or for heating the reaction chamber 101. The example system 300 can utilize fuel that is initially gaseous and/or the system 300 can utilize liquid or solid fuels that can be converted into gas or vapor.

The fuel source 136 may provide a single type of fuel and/or multiple different types of fuel, one or all of which may be oxidized in the reaction chamber 101. The fuel source 136 may provide hydrocarbon fuel and/or other types of fuel. The fuel source 136 may provide weak fuel. Weak fuels may include low BTU gases (i.e., low energy per unit mass) and/or fuels having low calorific value. Weak fuels may include gases containing fuels below a concentration that can sustain an open flame and/or other combustion reaction. For example, fuel may be mixed with air with the resultant fuel concentration below a lower explosive limit (LEL) for the fuel.

In some instances, introducing such a weak fuel to a spark or flame, even in the presence of air, may snuff out the spark or flame without oxidizing the fuel in the mixture. However, when the weak fuel is raised to a temperature above its auto-ignition temperature, the fuel can oxidize in the presence of air without introduction of a spark or flame. A specific example of weak fuels include gas that is mostly carbon dioxide or nitrogen, containing small quantities of methane, ethane, carbon monoxide, and other types of fuel. Such gas is often emitted from so-called unproductive natural gas wells. The fuel source 136 may provide fuels other than, or in addition to, weak fuels. For example, in some implementations, the fuel source 136 may provide propane, butane, kerosene, gasoline, and/or other types of fuels in addition to, or instead of, weak fuels. In some cases, the fuel source 136 may provide hydrogen fuel.

The fuel source 136 may include gas emanated from a landfill, which may contain only a small percentage of methane fuel (e.g., 3 percent). A gas having such a low concentration of methane may be below a lower explosive limit. The lower explosive limit (LEL) of a fuel may refer to the lowest concentration of the fuel in air capable of producing a flash of fire in presence of an ignition source. Concentrations lower than the LEL are typically too weak for combustion. Different types of fuel have different LEL values, typically in the range of approximately 1 percent to 5 percent by volume, although some fuels have an LEL outside of this approximate range. Some particular examples of LEL values are (approximately, on a volumetric basis) 3 percent for ethane, 4 percent for hydrogen, 5 percent for methane, and 2 percent for propane.

Fuel from the fuel source 136 can be a natural (e.g., non-anthropological) fuel source or a human-made (e.g., anthropological) fuel source. For example, the fuel source 136 may provide methane from cattle belches, a swampland, a rice farm, and/or methane produced by fermentation of organic matter. Other example fuel sources can include manure, municipal waste, wetlands, gas seeping from leaks in the system 300 or other systems, and drilling and recovery operations. In some implementations, the fuel source 136 includes fuel mixed with water, and fuel from the fuel source 136 includes water vapor. One or more supplemental fuel sources may also be utilized by the system 300.

The liquid source 131 provides all or part of the liquid mixture 138 in the fluid tank 104. The liquid mixture 138 provided by the liquid source 131 may include, or may be identical to, the liquid mixture 102 described with respect to FIGS. 1 and 2. The liquid source 131 may include multiple different sources of liquid water, liquid fuel, and/or other liquids to be processed by the system 300. In some implementations, the liquid source 131 provides only liquid water, only liquid fuel, or some combination of the two.

Some example fluid sources include wine-making facilities, ethanol production facilities, landfills, alcohol production facilities, coal mines, oil refineries, steel mills, chemical plants, oil fields, marshlands, sewage treatment facilities, and/or other sources of liquid fuel and/or liquid water. For example, streams in wine making, ethanol production and brewing may have off-spec products containing water that can be processed in the system 300. Ethanol is made in hundreds of ways, for example at stills large and small, any of which may be used as the liquid source 131. As the field of biofuels expands, more and more feed-stocks are used to make ethanol. In cases where raw materials such as algae, kudzu and wood are used for ethanol production, the system 300 may destroy lignin, fiber and marginal streams.

The liquid mixture 138 may include many different concentrations of alcohol, such as 40 proof, 100 proof, and/or other concentrations. As such, the system 300 could be located, for example, at a brewery, a biorefinery or ethanol plant to consume by-products at the plant. The system 300 could also be at a separate location and receive the by-products by delivery or distribution. In addition to these examples, the liquid mixture 138 may be received and/or produced in a different manner.

The system 300 may operate based on fuel from the fuel source 136, the system 300 may operate based on fuel from the liquid source 131, and/or the system 300 may operate based on fuel from both the fuel source 136 and the liquid source 131 at the same time and/or at different times. For example, the system 300 can run on kerosene or ethanol from the liquid source 131 initially at coal mines, where power is needed to drill wells to recover and drain methane. As methane is collected from the coal mines, the methane could serve as the fuel source 136, and could displace the kerosene or ethanol until the drained methane alone fuels the system 300.

Once the drained methane has been sufficiently depleted, the system 300 can operate on the mine's vent methane, providing clean power and destroying greenhouse gas. At steel mills, clean power could be supplied by a the system 300 running on kerosene or ethanol from the liquid source 131. When a blast furnace gas becomes available, the system 300 could operate on blast furnace gas from the fuel source 136. At oil refineries or chemical plants, VOC-bearing waste gas could fuel the system 300 instead being burned in a thermal oxidizer. Off-spec by-products such as naphtha can be used as supplementary fuel and produce clean power, for example, instead of being collected and transported by trucks to a disposal site. Low methane content gas from landfills can be combined with gas from oil and gas operations in proximity to the landfill to generate clean power. In addition to these example, the system 300 may operate based on liquid fuels and gaseous fuels in a different manner.

When the liquid mixture 138 includes liquid fuel, the system 300 may operate substantially as the system 100 of FIG. 1. For example, the evaporation chamber 118 may evaporate the liquid mixture 138, and the resulting gas mixture may be combined with air and communicated into the reaction chamber 101. The evaporated fuel from the evaporation chamber 118 may power the system 300 without fuel from the fuel source 136. In some cases, the air stream from the heat exchanger 122 includes fuel from the fuel source 136. As such, the fuel from the fuel source 136 and the evaporated fuel from the evaporation chamber 118 may be combined, and both may be simultaneously oxidized in the reaction chamber 101.

In some implementations, the liquid mixture 138 does not include significant amounts of liquid fuel, and the system 300 operates completely or substantially completely on fuel from the fuel source 136. For example, the liquid mixture 138 may include liquid water and/or other materials that do not release significant amounts of heat energy when they are processed in the reaction chamber 101. In such cases, heat released in the reaction chamber 101 by oxidizing fuel from the fuel source 136 may destroy contaminants, byproducts, and/or other materials in the liquid mixture 138. As an example, liquid water from a landfill may contain toxic materials and/or other types of contaminants that can be destroyed in the reaction chamber 101. As such, the liquid source 131 may be a landfill well that produces landfill fluids. The landfill fluids may include methane that is provided to the fuel source 136, and the landfill fluids may include water that is condensed and provided to the fluid tank 104.

In the example system 300, the liquid mixture 138 is evaporated in the evaporation chamber 118 using heat from the heat exchanger 122, as in the system 100 of FIG. 1. The liquid mixture 138 may alternatively or additionally be evaporated in another manner. For example, the liquid mixture 138 may be evaporated by injecting the mixture into a stream of hot air as in the system 200 of FIG. 2; in some implementations, the liquid mixture 138 may be evaporated in the reaction chamber 101.

The system 200 of FIG. 2 may be adapted to receive liquids from the liquid source 131 and/or fuel from the fuel source 136. In any of the systems 100, 200, 300, the liquid mixtures may be converted to a gas in the reaction chamber and/or prior to communicating the mixture into the reaction chamber. In cases where the liquid mixture is converted to a gas prior to the reaction chamber, the gaseous mixture may be combined with air, fuel, and/or other gases in the reaction chamber and/or prior to communicating the air, fuel, and other gases into the reaction chamber. Fluid communication through the systems 100, 200, 300, for example, between the various system components, may be measured by sensors and/or monitoring devices, may be controlled and/or regulated by control valves and other types of flow control devices, and/or may be contained by conduits, pipes, ports, chambers, and/or other types of structures. As such, the systems 100, 200, 300 may include additional devices, structures, and subsystems not specifically shown in the figures.

Figure 4A:
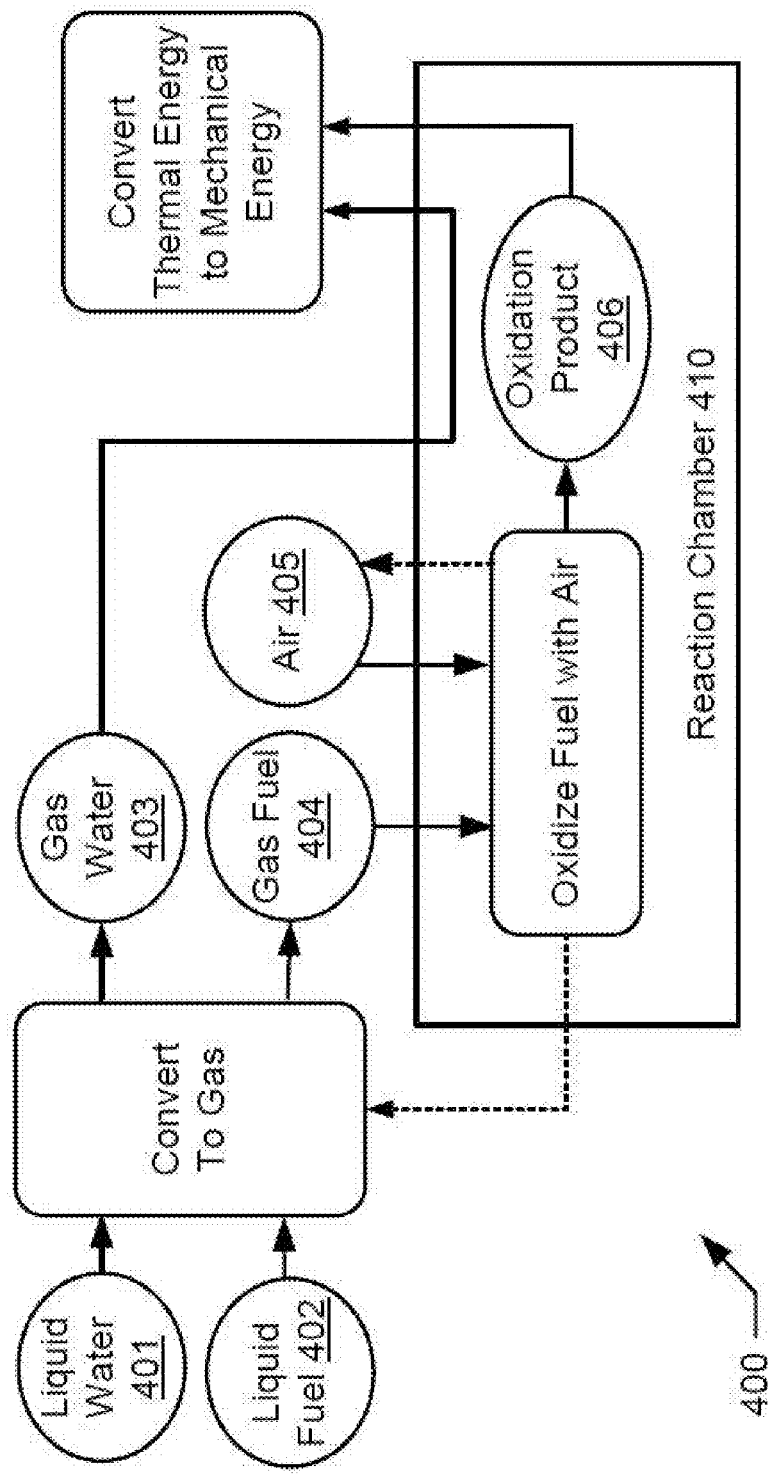
FIGS. 4A and 4B are schematic diagrams showing fluid flow in example oxidation reaction systems.
Figure 4B:
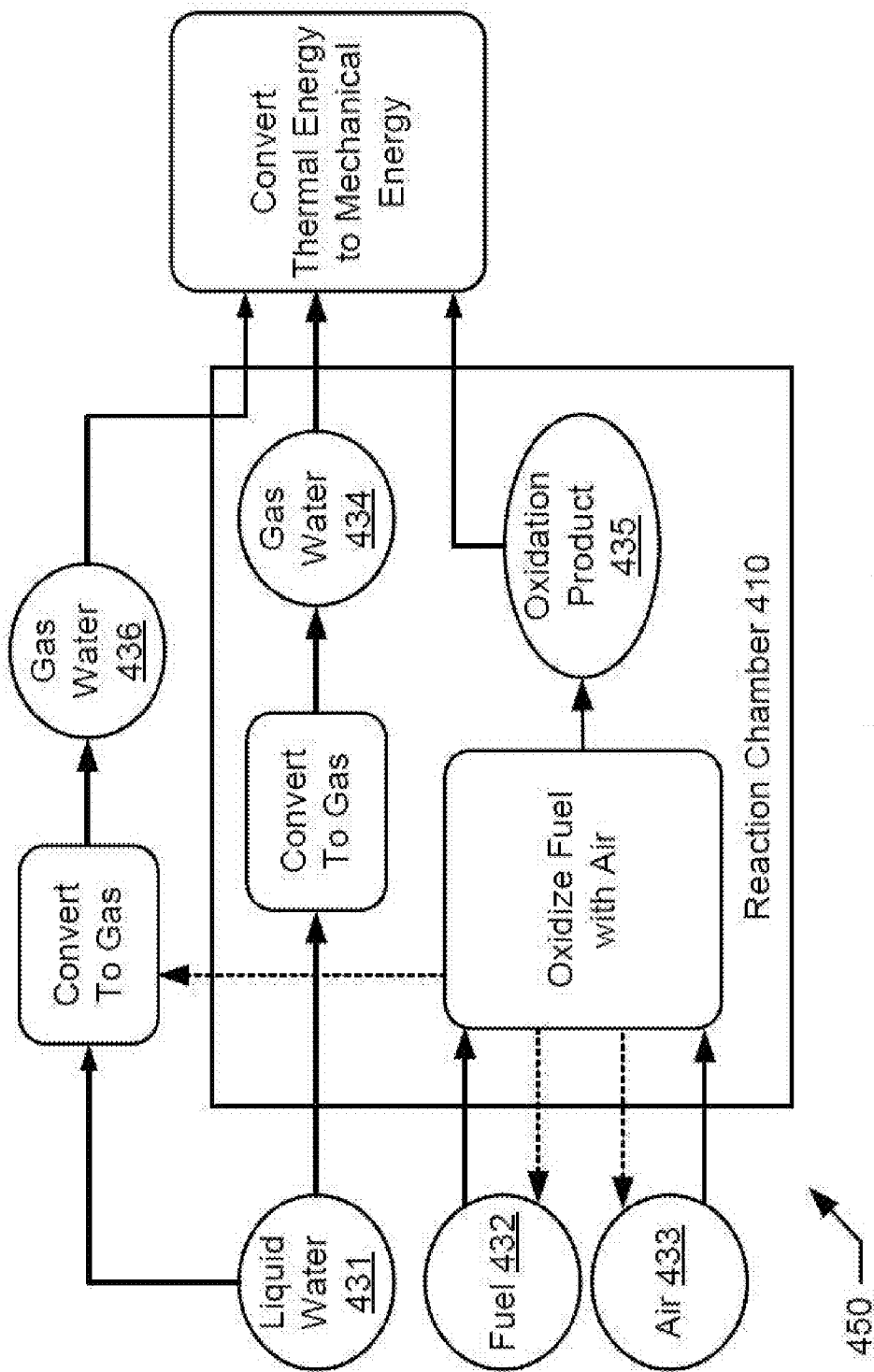

FIGS. 4A and 4B are schematic diagrams showing fluid flow in example oxidation reaction systems. In FIGS. 4A and 4B and 4B, the flow of water, fuel, and air are shown schematically. Although the fluids are shown separately in the diagrams, in various implementations, the fluids may be mixed at one or more appropriate points. For example, the liquid water and liquid fuel shown in FIG. 4A may be constituents of the liquid mixture 102 of FIGS. 1 and 2. As another example, the fuel and air shown in FIG. 4B may be an air/fuel mixture received in the compressor 114 of FIG. 3.

Fluids are shown in FIGS. 4A and 4B entering and exiting a reaction chamber 410. Each of the fluids may be communicated into the reaction chamber 410 separate from the other fluids shown, and/or one or more of the fluids shown be communicated into the reaction chamber 410 together with another fluid. For example, in some implementations, air and a fuel/water mixture are introduced into the reaction chamber 410 separately (i.e., the air through a first inlet and the fuel/water mixture through a second inlet), and in some implementations, the air and the fuel/water mixture are mixed to form an air/fuel/water mixture before the fuel enters the reaction chamber 410 (i.e., the air/fuel/water mixture may be introduced into the pressurized reaction chamber through a common inlet).

In some embodiments, air is mixed by a system with a mixture of fuel and water. In some embodiments the mixture of fuel and water is an evaporated gas. In some embodiments, an air/fuel mixture is mixed with a water mixture. In some embodiments, an air/fuel mixture is mixed with steam. In some embodiments, an air/fuel mixture is mixed with a mixture of fuel and water. In some embodiments, the mixture of fuel and water is an evaporated gas.

The dashed lines in FIGS. 4A and 4B are a schematic representation of heat energy from the reaction chamber used to increase the temperature of fluids outside the reaction chamber 410. In some implementations, the fluids are heated outside the reaction chamber 410 without heat from the reaction chamber 410, and one or more of the heat transfers represented in the figures may be omitted. In some implementations, additional and/or different fluids are heated outside the reaction chamber 410 by heat from the reaction chamber 410, and additional and/or different heat transfers are utilized.

FIGS. 4A and 4B both show fuel being oxidized with air in a reaction chamber 410. Fuel may be oxidized with air without raising the temperature of the fuel above a threshold temperature, for example, by maintaining the maximum temperature of the fuel in the reaction chamber below the threshold temperature. The threshold temperature may be a recommended or maximum operating temperature of the turbine, a recommended or maximum inlet temperature for the turbine, a temperature that causes formation of nitrogen oxides, a temperature selected based on the flow rate of the fuel through the reaction chamber 410 and/or other factors, etc. In some implementations, fuel is oxidized in the reaction chamber 410 below a temperature that causes formation of nitrogen oxides. The reaction chamber 410 can be the reaction chamber 101 shown in FIGS. 1, 2, and 3. The reaction chamber 410 may be a different type of oxidation reaction chamber. The reaction chamber 410 may be pressurized or non-pressurized.

In the examples shown, the heat energy released from oxidizing the fuel in the reaction chamber 410 is converted to mechanical energy. As such, a gas turbine, a steam turbine, and/or another system that converts thermal energy to mechanical energy may be used in connection with the reaction chamber 410. The mechanical energy may be converted to electrical energy, for example, by a generator. In some instances, the energy released from oxidizing the fuel in the reaction chamber 410 is used in additional or different manners.

In the example oxidation reaction system 400 shown in FIG. 4A, liquid water 401 and liquid fuel 402 are converted to gaseous water 403 and gaseous fuel 404. The fuel may include alcohol, kerosene, gasoline, and/or other types of fuel. The gaseous fuel 404 may include fuel vapor and/or fuel in another type of gaseous state. The gaseous water 403 may include water vapor and/or water in another type of gaseous state. The gaseous water 403, gaseous fuel 404, and the air 410 are communicated into the reaction chamber 410. The fuel 404 is oxidized with the air 405 in the reaction chamber 410, while the fuel 404, the air 405, and the water 403 are in the reaction chamber 410.

Contaminants, toxic materials, and/or other substances mixed with the water 403 may be destroyed, oxidized, and/or otherwise modified in the reaction chamber 410. Contaminants, which may include toxic materials, include substances that can be harmful to the environment and/or living organisms. The oxidation reaction of the fuel 404 and air 405 generates an oxidation product gas 406, which is communicated out of the reaction chamber 410 with the water 403. The thermal energy of the water 403 and the oxidation product 406 is converted to mechanical energy.

In the example oxidation reaction system 450 shown in FIG. 4B, liquid water 431 is communicated into the reaction chamber 410, and/or liquid water 431 is converted to gaseous water 436 outside of the reaction chamber. In implementations where the liquid water 431 is communicated into the reaction chamber 410, the liquid water 431 is converted to gaseous water 434 in the reaction chamber 410.

In implementations where the liquid water 431 is converted to gaseous water 436 outside of the reaction chamber 410, the gaseous water 436 is communicated into the reaction chamber 410. The fuel 432 and the air 433 are communicated into the reaction chamber 410. The fuel 432 is oxidized with the air 433 in the reaction chamber 410 while the fuel 432, the air 433, and the water 434 and/or the water 436 are in the reaction chamber. The oxidation reaction of the fuel 432 and air 433 generates an oxidation product gas 435, which is communicated out of the reaction chamber 410 with the water 434 and/or the water 436. The thermal energy of the water 434 and/or the water 436 and the oxidation product 435 is converted to mechanical energy.

In both the example systems 400, 450, the conversion from liquid to gas may include an evaporation process that utilizes heat from oxidizing the fuel in the reaction chamber 410. The conversion from liquid to gas may include evaporation, vaporization, boiling, and/or other types of processes. Contaminants, toxic materials, and/or other substances mixed with the water 403, 434, and/or 436 may be destroyed, oxidized, and/or otherwise modified in the reaction chamber 410 in either of the example systems 400, 450. The mass of the water 403, 434, and/or 436 may increase the mechanical energy output of the example systems 400, 450.

Injection of water or steam into combusted gas in gas turbines can increase output of the turbines. However, in order to compensate for the temperature reduction resulting from such injection, it has been necessary to increase the amount of fuel combusted, which leads to greater temperatures and results in increased formation of harmful NOx gas. In some embodiments, as mentioned above, the gradual oxidation system described herein can provide oxidation of fuels without increasing NOx formation, and while increasing output of the system, by providing water into the system.

As explained in connection with embodiments described herein, the fuel of the systems is oxidized as an air/fuel mixture flows along the flow path in the reaction chamber. The fuel is preferably oxidized by a flameless gradual oxidation process that destroys substantially all of the fuel. The fuel is preferably oxidized at a temperature sufficiently low to reduce or prevent formation and/or emission of harmful compounds, such as nitrogen oxides, and at a temperature sufficiently high to oxidize the fuel and other contaminants that are introduced into the chamber.

The air/fuel mixture flows through the reaction chamber and absorbs heat from the interior surface of the reaction chamber and fill material contained within the chamber. As a result, the temperature of the air/fuel mixture gradually increases as the mixture flows through the reaction chamber. When the temperature of the air/fuel mixture reaches or exceeds an auto-ignition temperature of the fuel, the fuel undergoes an exothermic oxidation reaction. Thus, the oxidation reaction may be initiated independent of an oxidation catalyst material or an ignition source. In some cases, a catalyst material may be provided in the reaction chamber to effectively lower the auto-ignition temperature of the fuel, but advantages of the systems described herein include operation of the reaction chamber to achieve a gradually oxidation of the air/fuel mixture without a catalyst.

When the fuel oxidizes, the exothermic reaction imparts heat to the reaction chamber and fill material, and heat energy is communicated to another region of the flow path in the reaction chamber. The heat energy transferred through the reaction chamber may be imparted to incoming fuel to help initiate oxidation of the incoming fuel. The reaction chamber may be designed such that under a range of operating conditions (e.g., at maximum flow rate and fuel concentration), sufficient dwell time and fuel temperature are provided to allow some or all of the fuels in the air/fuel mixture to oxidize substantially to completion. In some cases, the temperature of the air/fuel mixture in the reaction chamber can be controlled to maintain the maximum temperature of the air/fuel mixture substantially at or below a desired inlet temperature of the turbine.

The gas turbine systems described herein are not combustors; they are gradual oxidizers. Rather than combust the fuel rapidly, these systems slowly oxidize the fuel, releasing the heat in a manner that avoids combustion altogether. They thus also avoid the problems associated with combustion, such as a sharp peak in temperature.

As described above, several embodiments contemplate adding steam or water to the system for one or more of many reasons (e.g., to reduce likelihood of combustion, to control temperature, to increase efficiency and/or output, etc.). The differences between these systems and combustion systems as regards introduction of steam or water is significant. For example, introduction of the steam or water upstream of the gas turbine combustor can interfere with the completeness of combustion and may result in release of unburned hydrocarbons. Introduction of steam downstream of the gas turbine combustor will have a chilling effect on gases and will therefore require the combustor to provide additional fuel, increasing the maximum flame temperature and increasing the formation of harmful NOx emissions. Introduction of water downstream of the combustor will require more fuel to be combusted, further exacerbating the situation by forming even more harmful NOx.

Embodiments of the gradual oxidation systems described herein avoid such problems because they allows sufficient time to enable recovery from the potential upset conditions described above. These embodiments also have several other advantages. The reaction chamber is much larger than a combustor. It is packed with ceramic fill material. Any dissolved solids that are in the water will plate out on the fill material, thus reducing or eliminating the need to purify the water prior to use. In several applications, such as with landfills and water treatment plant digesters, a lot of contaminated water is collected on site. This water would otherwise have to be removed to a facility for treating such contaminated water. By introducing the water into the system, and even into the reaction chamber, not only are the contaminants destroyed, but any fuel value in such contaminants is recovered through oxidation of the contaminants.

Figure 5:
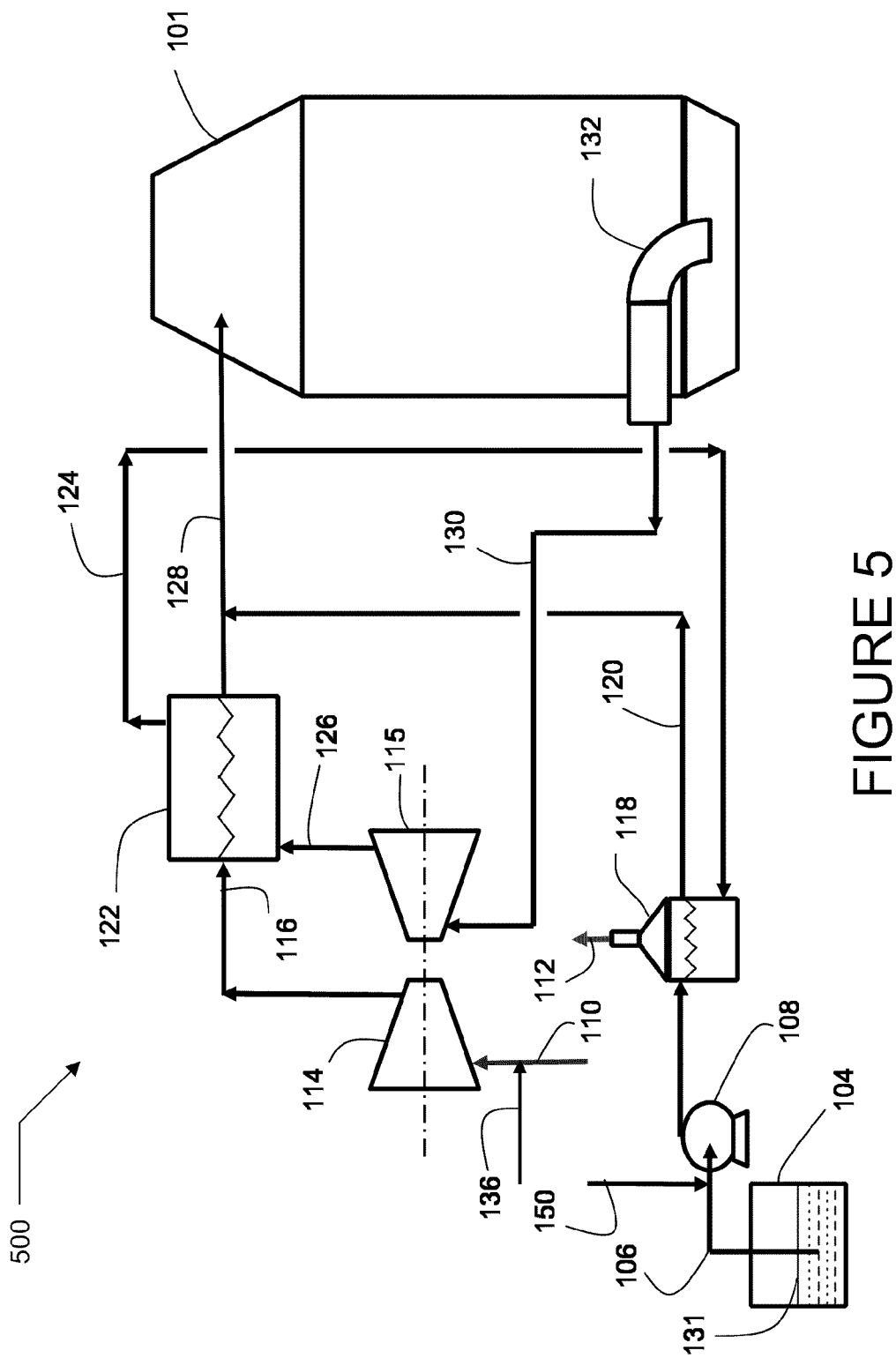
FIG. 5 is a diagram of embodiments of a gas turbine system.

FIG. 5 illustrates embodiments of a process flow diagram for a gas turbine system 500 with steam injection. Air is drawn into the system from an air source 110 and fuel gas is introduced via a fuel source 136. The air and fuel are mixed together at atmospheric pressure, and the mixture is compressed in a compressor 114. The compressed mixture is heated in a heat exchanger 122, from where it is delivered through pipe 128 to a gradual oxidation reaction chamber 101.

The reaction chamber 101 is maintained at a temperature sufficient to oxidize the fuel in the mixture, with the heat of oxidation raising the temperature of the product gases. The temperature in the reaction chamber 101 is maintained sufficiently high to oxidize all fuel in the mixture, but below the temperature that would cause the formation of harmful NOx gas.

Exhaust gas from the reaction chamber 101 is taken through exhaust pipe 132 and conduit 130 to the turbine 115, where the exhaust gas is expanded, delivering useful power to drive the compressor 114, and for other uses, such as generation of electricity through a generator. The density of gas is inversely related to its temperature. When ambient temperature increases, the density of incoming air and the fuel/air mixture decreases, and the mass of the gas flowing through the compressor therefore also declines. This lower mass flow results in reduced power output from the gas turbine, thus reducing the energy converted into electricity.

In several areas, the most expensive electricity is during peak summer days because that is when demand is highest, and that is also when traditional power plant output drops. The gas turbine systems described herein can increase the power output of the gas turbine power plant, thereby generating electric power precisely when it is most needed. One way this can be accomplished is by the introduction of water or steam into the system.

Water is available from a water source 150 or from a liquid tank 104 having a liquid source 131. The water is delivered through conduit 106 to pump or pressurizing device 108, where it is pressurized. The water is then communicated to an evaporation chamber 118, and the resulting steam is communicated through conduit 120 to conduit 128, which is then introduced to the reaction chamber 101. Heat for evaporation of the water is drawn from turbine exhaust gas, which passes through conduit 126, heat exchanger 122, conduit 124 to the evaporation chamber 118. The steam/air/fuel mixture conducted to the reaction chamber 101 by conduit 128 has a higher mass flow than just the air/fuel mixture. With higher mass flow, there is now increased mass flow through the reaction chamber 101 and through the turbine 115, resulting in increased production of electricity.

In some embodiments, the water or steam injected into the system comprises between about 50% and about 80% of the fuel mixture, comprising fuel and air, by volume. In some embodiments, the water or steam injected into the system comprises between about 40% and about 85% of the fuel mixture, and in further embodiments, the water or steam comprises between about 20% and about 90% of the fuel mixture.

Other reactions can facilitate achieving an increased output. The steam entering the conduit 128 is at a lower temperature than the fuel/air mixture and the temperature of the gases entering the reaction chamber 101 will therefore be lower than without steam introduction. It is therefore advantageous to increase or otherwise adjust the fuel/air ratio of the gas entering the compressor 114 based on the amount of steam to be introduced into conduit 128.

In some embodiments, the fuel/air ratio is dependent upon the amount of steam introduced into the conduit 128. For example, during operation, the system may operate in a first state without introduction of steam into conduit 128. In this first state, the system may be operating under a first fuel/air ratio. In a second state, the steam can be introduced into conduit 128, and a desired fuel/air ratio can be determined and implemented, based on the amount of steam introduced into conduit 128, in order to maintain the gradual oxidation processes within the reaction chamber 101. Maintenance of the oxidation process can be accomplished without increasing the maximum temperature inside the reaction chamber while still achieving full oxidation of the fuel inside the reaction chamber.

The increased mass flow and fuel flow will increase the energy delivered to the turbine 115, and will therefore increase the output of the turbine system. The energy consumed by the compressor 114 remains largely the same as before, and the increased turbine output is used by the generator to increase its output of electricity.

Figure 6:
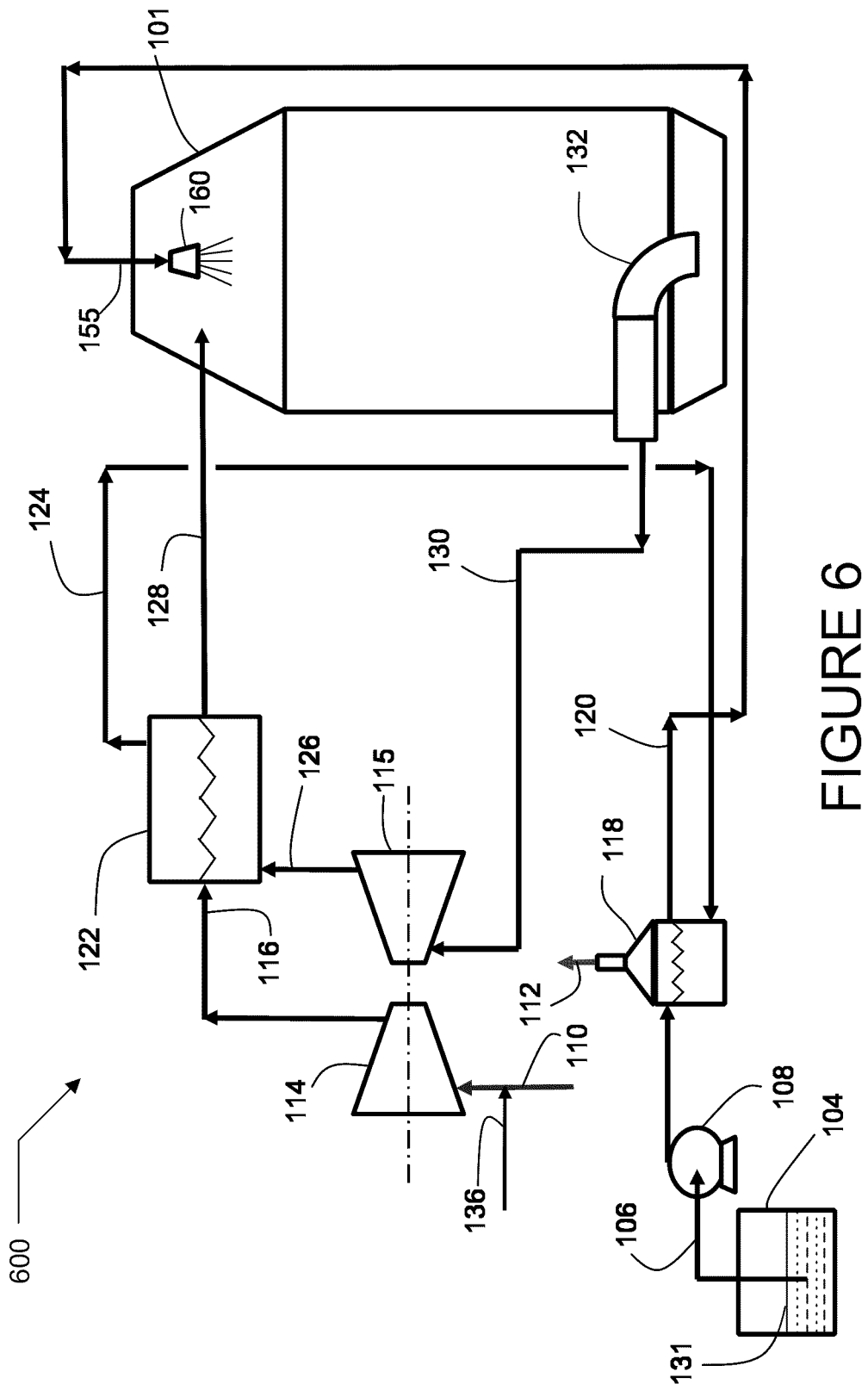
FIG. 6 is a diagram of further embodiments of a gas turbine system.

FIG. 6 shows embodiments of a modified flow pattern that achieves substantially the same result as the embodiments depicted in FIG. 5. In the gas turbine system 600 of FIG. 6, the steam is taken by conduit 120 directly into the reaction chamber 101 by conduit 155. The steam is introduced from conduit 155 into the reaction chamber 101 by an inlet 160, which can be, for example, a nozzle. While the point of introduction is farther downstream than before (i.e., deposited within the reaction chamber 101 instead of into conduit 128), the results are substantially the same. Additional fuel flow can be provided by increasing the fuel/air ratio, thus releasing additional heat within the reaction chamber 101, and thereby raising the temperature to the same threshold as before, resulting in additional energy converted into electricity.

The exhaust gas from the reaction chamber 101 is expelled through exhaust pipe 132 and conduit 130 to the turbine 115, where the exhaust gas is expanded, delivering power to drive the compressor 114. After the exhaust gas is expanded in the turbine 115, it is communicated to the heat exchanger 122 for heating the fuel/air mixture from the compressor 114. The exhaust gas is then conducted to the evaporation chamber 118 via conduit 124 for heating and/or evaporating water from the pressuring device 108. After passing through the evaporation chamber 118, the exhaust gas can be expelled from the system through outlet 112.

Figure 7:
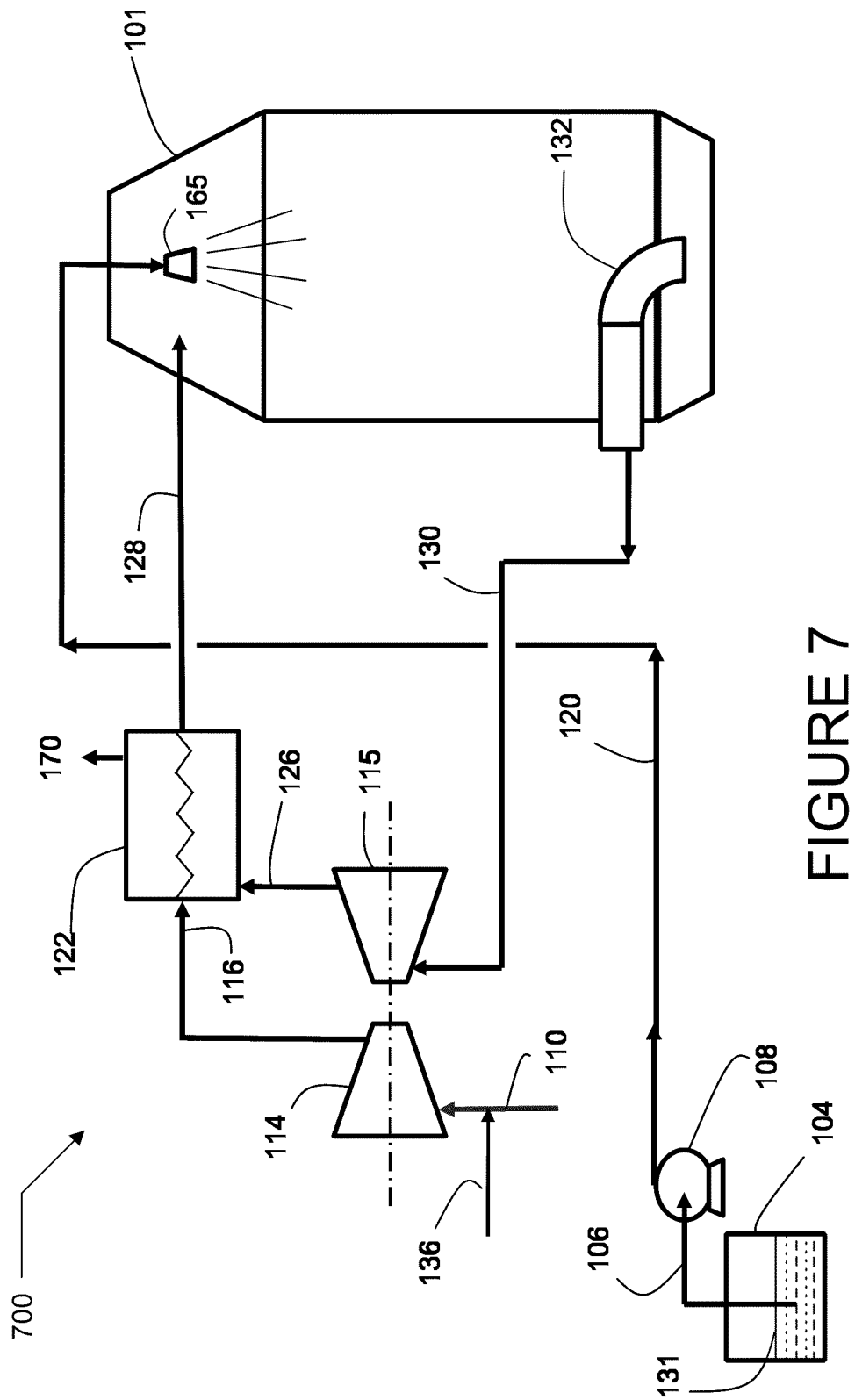
FIG. 7 is a diagram of further embodiments of a gas turbine system.

FIG. 7 illustrates further embodiments of a gas turbine system 700 that provides water to be introduced directly into the reaction chamber 101. With this illustrated flow pattern, the evaporation of the water occurs inside the reaction chamber 101. This requires an even higher fuel/air ratio than before to accommodate the energy needed to heat the water and evaporate it into steam within the reaction chamber 101.

Water is provided from the liquid source 131 to the pressurizing device 108 via conduit 106. The water is then communicated from the pressurizing device 108 directly to the reaction chamber 101 through conduit 120. The water is introduced into the reaction chamber from conduit 120 through an inlet 165, which can be, for example, a nozzle. The exhaust gas from the reaction chamber 101 is expelled through exhaust pipe 132 and conduit 130 to the turbine 115, where the exhaust gas is expanded, delivering power to drive the compressor 114. After the exhaust gas is expanded in the turbine 115, it is communicated to the heat exchanger 122 for heating the fuel/air mixture from the compressor 114. The exhaust gas can then be expelled from the system through outlet 170.

Efficiency can be improved in the system by utilizing waste heat to generate steam, and the more recovery of heat by steam generation, the more efficient the system can be. The impact on efficiency may be computed as follows: If 100 kWh of heat is available in the fuel, approximately 30 kWh of heat are converted into electricity. Without steam injection, the remaining 70 kWh of heat is exhausted, resulting in, for example, about 30% efficiency. However, if steam is to be injected, about 35 kWh of the heat otherwise exhausted can be transferred by the system to the water to generate steam. This steam must now be mixed with other gases and further heated to raise the temperature of the gases to the desired threshold. This heating requires additional fuel to be supplied and oxidized. When, for example, 10 kWh of additional fuel is needed to heat the steam to the appropriate temperature, and if an additional 3 kWh is generated, the efficiency stays the same as above: about 30% efficient. When more than an additional 3 kWh is generated, the efficiency improves to be great than about 30%; and if less than 3 additional kWh is generated, the efficiency declines to be less than about 30%.

Additional considerations include the electrical energy required to pump the water to the desired pressure, and the losses in the system resulting from increased flow. While efficiencies of the described system can be improved over systems not incorporating water or steam, one of the advantages of the embodiments described herein is that the gradual oxidation systems that include supplementation by water or steam can achieve greater power output, particularly when ambient conditions would otherwise reduce power output.

Although preferred embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. In addition, while a number of variations have been shown and described in varying detail, other modifications, which are within the scope of the present disclosure, will be readily apparent to those of skill in the art based upon this disclosure. It is also contemplated that various combinations or subcombinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described above.

What is claimed is:

1. A method comprising:
    evaporating a liquid comprising water and fuel to form a gas comprising evaporated fuel and steam;
    communicating the water into a reaction chamber that is pressurized above an ambient pressure about an exterior of the reaction chamber; and
    oxidizing the gas with air in the pressurized reaction chamber while maintaining a maximum temperature in the reaction chamber below a temperature that causes formation of nitrogen oxides.

2. The method of claim 1, wherein communicating the water into the pressurized reaction chamber comprises communicating the liquid into the pressurized reaction chamber, and wherein evaporating the liquid comprises evaporating the liquid in the pressurized reaction chamber.

3. The method of claim 2, further comprising communicating into the pressurized reaction chamber an air/fuel mixture comprising the air and the fuel.

4. The method of claim 1, wherein the fuel comprises at least one of ethanol or kerosene.

5. The method of claim 1, wherein the liquid comprises more than fifty percent water by volume.

6. The method of claim 1, wherein communicating the water into the pressurized reaction chamber comprises communicating the gas comprising the evaporated fuel and the steam into the pressurized reaction chamber, the method further comprising communicating the air into the pressurized reaction chamber.

7. The method of claim 1, further comprising mixing the air with the gas comprising the evaporated fuel and the steam, wherein communicating the water into the pressurized reaction chamber comprises communicating a mixture comprising the air, the evaporated fuel and the steam into the pressurized reaction chamber.

8. The method of claim 1, wherein communicating the water into the pressurized reaction chamber comprises communicating the liquid into the pressurized reaction chamber, and evaporating the liquid comprises evaporating the liquid in the pressurized reaction chamber.

9. The method of claim 1, wherein the liquid further comprises the fuel, evaporating the liquid comprises evaporating the fuel and the water by mixing the liquid with heated air, wherein the gas comprises the heated air, the evaporated fuel and the steam, and wherein communicating the water into the pressurized reaction chamber comprises communicating the gas comprising the heated air, the evaporated fuel and the steam into the pressurized reaction chamber.

10. The method of claim 1, wherein oxidizing the fuel generates an oxidation product gas, the method further comprising expanding the oxidation product gas in a gas turbine.

11. The method of claim 10, wherein expanding the oxidation product gas in the gas turbine drives a generator mechanically coupled to the gas turbine.

12. The method of claim 1, wherein the liquid is water drained from a landfill or condensed moisture in landfill gas.

13. The method of claim 12, wherein the landfill gas comprises the fuel.

14. The method of claim 1, wherein the liquid comprises contaminants, and communicating the water into the pressurized reaction chamber comprises communicating the contaminants into the reaction chamber, and wherein the contaminants are oxidized, in the reaction chamber, into at least $CO_2$, $H_2O$, and $O_2$.

15. A system comprising:
    an evaporator that evaporates a liquid comprising water and fuel in a liquid state to form a gas comprising the water and the fuel in a gaseous state, the evaporator comprising:
        an evaporator inlet arranged to receive the liquid;
        an evaporator outlet arranged to communicate the gas from the evaporator; and
    a reaction chamber comprising a reaction chamber inlet in fluid communication with the evaporator outlet to receive the gas, the reaction chamber configured to oxidize fuel with air while containing the air and the gas at a pressure above an ambient pressure about the reaction chamber and while maintaining a maximum temperature in the reaction chamber below a temperature that causes formation of nitrogen oxides.

16. The system of claim 15, wherein the reaction chamber further comprises one or more additional reaction chamber inlets arranged to receive at least one of the fuel or the air.

17. The system of claim 15, further comprising a turbine having a turbine inlet in fluid communication with an outlet of the reaction chamber the turbine configured to receive an oxidation product from the reaction chamber and convert thermal energy of the oxidation product to mechanical energy by expanding the oxidation product between the turbine inlet and a turbine outlet.

18. The system of claim 17, further comprising a generator mechanically coupled to the turbine, the generator configured to convert the mechanical energy to electrical energy.

19. An oxidation reaction chamber comprising:
a first inlet arranged to communicate a liquid fuel mixture comprising water and fuel into an interior volume of the reaction chamber;
a second inlet arranged to communicate a gas fuel mixture comprising air and fuel into the interior volume, the reaction chamber adapted to oxidize the liquid fuel mixture with the liquid fuel mixture in the interior volume while maintaining a maximum temperature in the reaction chamber below a temperature that causes formation of nitrogen oxides; and
an outlet arranged to communicate an output gas from the interior volume, the output gas comprising the water and an oxidation product gas generated by oxidizing the fuel in the interior volume.

20. The oxidation reaction chamber of claim 19, wherein the outlet is in fluid communication with a turbine inlet.

21. The oxidation reaction chamber of claim 19, wherein the liquid fuel mixture further comprises contaminants, and the maximum temperature in the reaction chamber is at or above an oxidation temperature of the contaminants.

22. The oxidation reaction chamber of claim 19, wherein the gas further comprises contaminants that may be oxidized within the reaction chamber and the temperature in the oxidation temperature at or above the temperature to oxidize the contaminants.

23. A gradual oxidation system comprising:
a fluid inlet;
a compressor that receives and compresses a gas, comprising a first fuel mixture, from the fluid inlet;
an injector that introduces a second fuel mixture into the gas, the second fuel mixture comprising a liquid having a mixture of fuel and water, wherein the water comprises between 20% and 90% of the second fuel mixture by volume; and
a gradual oxidation chamber that receives the gas from the compressor and that maintains a flameless oxidation process of the gas within the chamber without a catalyst.

24. The system of claim 23, further comprising a turbine that receives the heated and compressed gas from the gradual oxidation chamber and expands the gas.

25. The system of claim 23, wherein the injector introduces the second fuel mixture before the gas is compressed by the compressor.

26. The system of claim 23, wherein the injector introduces the second fuel mixture into the gas after the gas has been compressed and before the gas is received into the gradual oxidation chamber.

27. The system of claim 23, wherein the injector introduces the second fuel mixture into the gradual oxidation chamber.

28. The system of claim 27, further comprising a compressor that compresses the second fuel mixture prior to introducing the second fuel mixture into the gradual oxidation chamber.

29. The system of claim 23, wherein the second fuel mixture comprises at least one of ethanol, gasoline, and petroleum distillates.

30. The system of claim 23, wherein the second fuel mixture comprises a fuel-to-water mixture of about 25% fuel by volume.

31. The system of claim 23, wherein the injector is configured to inject the second fuel mixture into the system as a liquid.

32. The system of claim 23, wherein the injector is configured to inject the second fuel mixture into the system as a gas.

33. The system of claim 23, wherein the ratio of fuel-to-water mixture of the second fuel mixture is based on a determination of the fuel-to-air mixture of the first fuel mixture.

34. A gradual oxidation system comprising:
a fluid inlet;
a compressor that receives and compresses fluid, comprising a fuel mixture, from the fluid inlet;
an evaporator that evaporates a liquid comprising liquid fuel and water to form a gas comprising gaseous fuel and steam;
an injector that introduces the gas into the fluid after the fluid is compressed by the compressor;
a gradual oxidation chamber that receives the fluid from the compressor and that maintains a flameless oxidation process of the fluid within the chamber without a catalyst; and
a turbine that receives the heated and compressed fluid from the gradual oxidation chamber and expands the fluid.

35. The system of claim 34, wherein the injector introduces steam before the fluid is compressed by the compressor.

36. The system of claim 34, wherein the injector introduces steam into the fluid after the fluid has been compressed and before the fluid is received into the gradual oxidation chamber.

37. The system of claim 34, wherein the injector introduces steam into the gradual oxidation chamber.

38. The system of claim 37, further comprising a steam compressor that compresses the steam prior to introducing the steam into the gradual oxidation chamber.

39. A method of gradually oxidizing a fuel mixture, the method comprising:
aspirating air into a gradual oxidation system via a fluid inlet;
mixing the air with fuel to form a first fuel mixture;
compressing the first fuel mixture;
injecting a second fuel mixture, comprising a liquid fuel and water, into the system to combine the second fuel mixture with the first fuel mixture;
gradually oxidizing the first and second fuel mixtures in a gradual oxidation chamber that maintains a flameless oxidation process of a fluid, comprising the first and second fuel mixtures, without a catalyst;
directing heated and compressed fluid from the gradual oxidation chamber to a turbine; and
expanding the fluid with the turbine.

40. The method of claim 39, wherein the water is injected into the system prior to the compressing of the fuel mixture.

41. The method of claim 39, wherein the water is injected into the system after the compressing of the fuel mixture and before the gradually oxidizing of the fuel mixture.

42. The method of claim 39, wherein the water is injected into the gradual oxidation chamber.

43. A method of gradually oxidizing a fuel mixture, the method comprising:
aspirating air into a gradual oxidation system via a fluid inlet;
mixing the air with fuel to form a first fuel mixture;
compressing the fuel mixture;
injecting a second fuel mixture into the system to combine the second fuel mixture with the first fuel mixture, the second fuel mixture comprising a liquid having a mixture of fuel and water, wherein water comprises between 20% and 90% of the second fuel mixture by volume; and gradually oxidizing the first and second fuel mixtures in a gradual oxidation chamber that maintains a flameless oxidation process of the fluid without a catalyst.

44. The method of claim 43, further comprising directing heated and compressed fluid from the gradual oxidation chamber to a turbine and expanding the fluid with the turbine.

45. The method of claim 43, wherein the second fuel mixture is injected into the system before the fluid is compressed by the compressor.

46. The method of claim 43, wherein the second fuel mixture is injected into the system after the fluid has been compressed and before the fluid is received into the gradual oxidation chamber.

47. The method of claim 43, wherein the second fuel mixture is injected into the gradual oxidation chamber.

48. The method of claim 47, further comprising compressing the second fuel mixture with a compressor prior to introducing the second fuel mixture into the gradual oxidation chamber.

49. The method of claim 43, wherein the second fuel mixture comprises at least one of ethanol, gasoline, and petroleum distillates.

50. The method of claim 43, wherein the second fuel mixture is injected into the system as a liquid.

51. The method of claim 43, wherein the second fuel mixture is injected into the system as a gas.

52. The method of claim 43, further comprising determining the ratio of the fuel-to-air mixture of the first fuel mixture and adjusting the ratio of fuel-to-water mixture of the second fuel mixture based on first fuel mixture ratio.

\* \* \* \* \*